(12) United States Patent
Urano et al.

(10) Patent No.: US 10,663,844 B2
(45) Date of Patent: May 26, 2020

(54) PROJECTION CONTROL APPARATUS AND CONTROL METHOD THEREOF, AND PROJECTION SYSTEM

(71) Applicant: CANON KABUSHIKI KAISHA, Tokyo (JP)

(72) Inventors: Yuta Urano, Kawasaki (JP); Kensuke Inagaki, Tokyo (JP); Makiko Mori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/214,459

(22) Filed: Dec. 10, 2018

(65) Prior Publication Data

US 2019/0191134 A1    Jun. 20, 2019

(30) Foreign Application Priority Data

Dec. 15, 2017 (JP) ................................. 2017-241121
Dec. 15, 2017 (JP) ................................. 2017-241122

(51) Int. Cl.
*G03B 21/14* (2006.01)
*H04N 9/31* (2006.01)

(52) U.S. Cl.
CPC ......... *G03B 21/147* (2013.01); *H04N 9/3147* (2013.01); *H04N 9/3182* (2013.01); *H04N 9/3185* (2013.01); *H04N 9/3194* (2013.01)

(58) Field of Classification Search
CPC .. H04N 9/3185; H04N 9/3147; H04N 9/3182; H04N 9/3194; G03B 21/147
See application file for complete search history.

(56) References Cited

U.S. PATENT DOCUMENTS 6,456,339 B1 * 9/2002 Surati .................... G03B 37/04
348/744
7,227,521 B2    6/2007 Yamazaki et al.
7,307,606 B1    12/2007 Yamazaki et al.
(Continued)

FOREIGN PATENT DOCUMENTS

JP        2008-225297 A      9/2008

OTHER PUBLICATIONS

Feb. 12, 2019 European Search Report in European Patent Appln. No. 18208061.4.

*Primary Examiner* — Cara E Rakowski
*Assistant Examiner* — Magda Cruz
(74) *Attorney, Agent, or Firm* — Venable LLP

(57) ABSTRACT

A projection control apparatus that controls projection using a plurality of projection devices that project optical images onto a projection plane. The projection control apparatus obtains a projected area of each of the plurality of projection devices on the basis of an image obtained by capturing the projection plane. The projection control apparatus then executes a first adjustment process of adjusting the projected area of each projection device so as to cause the projected areas of other projection devices, among the plurality of projection devices, that are not a reference projection device, to correspond to the projected area of the reference projection device. The projection control apparatus cancels geometric correction applied in the other projection devices before starting the first adjustment process and does not cancel geometric correction applied in the reference projection device before starting the first adjustment process.

18 Claims, 16 Drawing Sheets

(56) References Cited

U.S. PATENT DOCUMENTS

| | | |
|---|---|---|
| 7,889,168 B2 | 2/2011 | Yamazaki et al. |
| 8,061,853 B2 | 11/2011 | Miyazawa et al. |
| 8,174,542 B2 | 5/2012 | Mori |
| 9,137,504 B2 * | 9/2015 | Gelb .................... H04N 9/3147 |
| 9,811,876 B2 | 11/2017 | Mori et al. |
| 2008/0225186 A1 | 9/2008 | Miyazawa et al. |
| 2010/0103385 A1 * | 4/2010 | Kubota ................ G03B 21/147 |
| | | 353/70 |
| 2010/0103386 A1 * | 4/2010 | Kubota ................ H04N 9/3185 |
| | | 353/70 |
| 2011/0025982 A1 * | 2/2011 | Takahashi .............. G03B 21/14 |
| | | 353/15 |
| 2014/0111536 A1 | 4/2014 | Shinozaki |
| 2016/0094821 A1 | 3/2016 | Mori |

\* cited by examiner

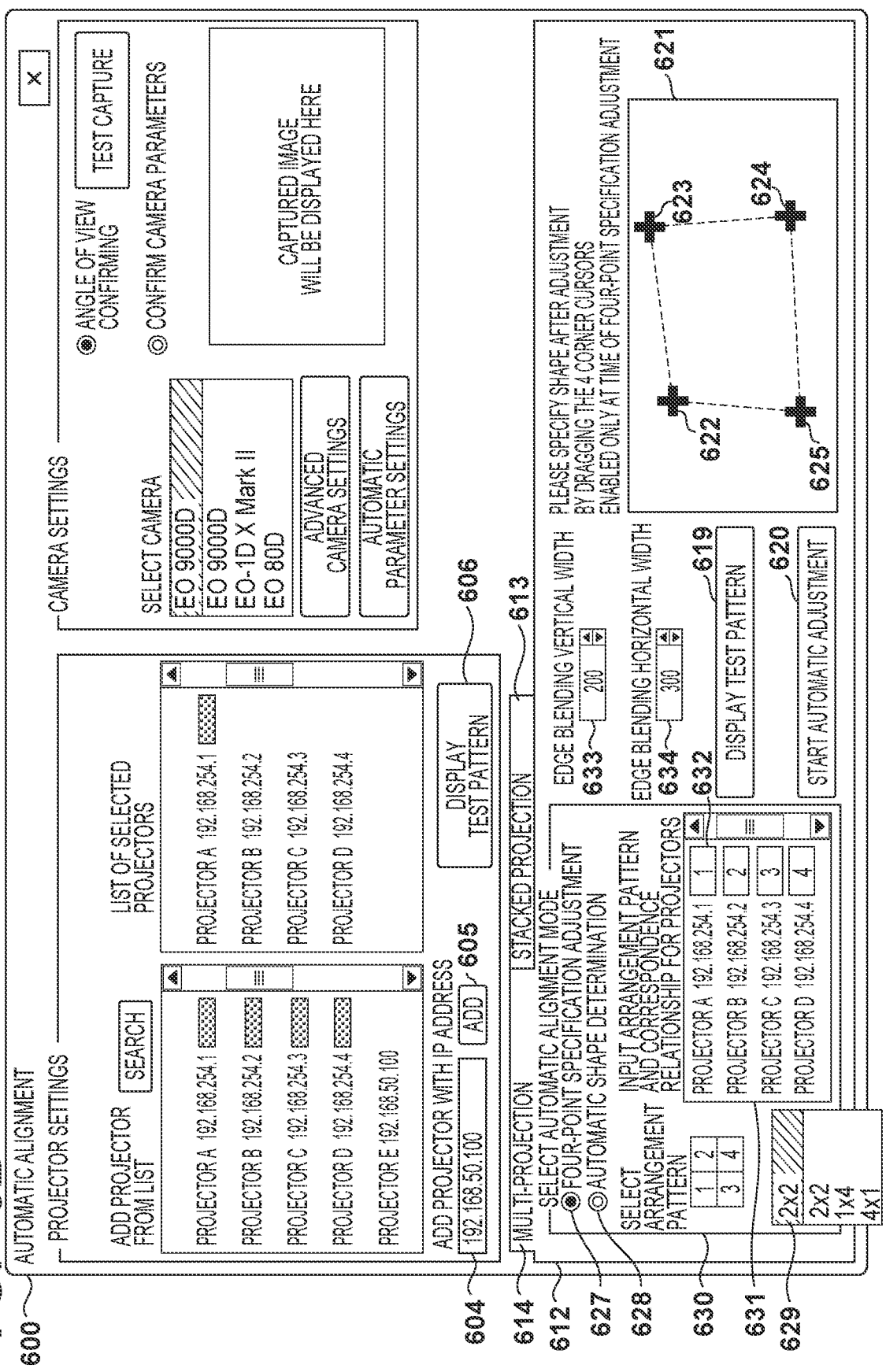

EXAMPLE OF ARRANGEMENT WHERE AUTOMATIC ALIGNMENT IS POSSIBLE

EXAMPLE OF ARRANGEMENT WHERE AUTOMATIC ALIGNMENT IS IMPOSSIBLE

TEST PATTERN A

TEST PATTERN B

FIG. 11A PATTERN IMAGE TO CAUSE REFERENCE PROJECTOR TO PROJECT

FIG. 11B PATTERN IMAGE TO CAUSE PROJECTORS OTHER THAN REFERENCE PROJECTOR TO PROJECT

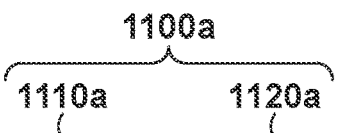
FIG. 12A
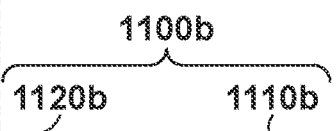
FIG. 12B
FIG. 12C
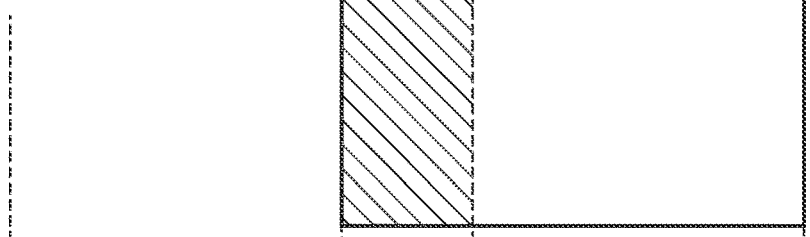
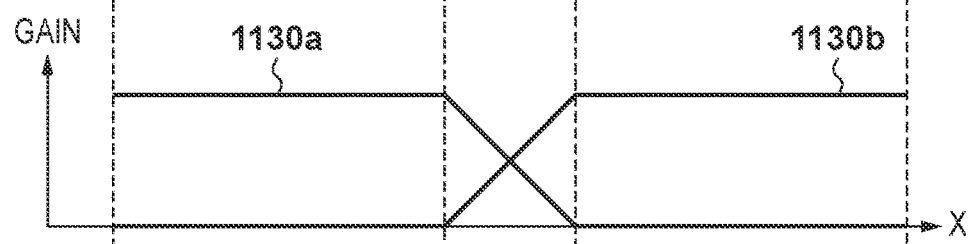
FIG. 12D
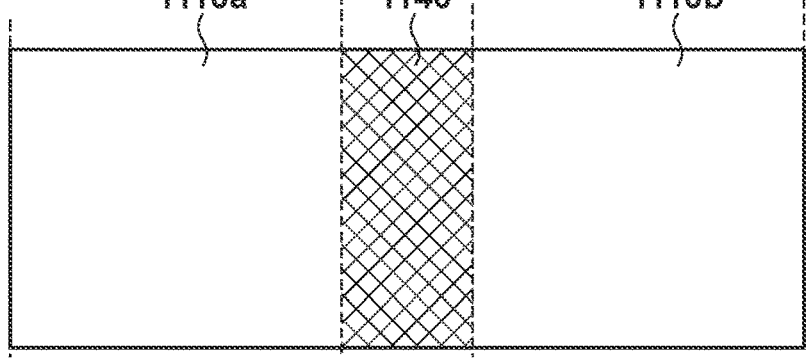

PROJECTION CONTROL APPARATUS AND CONTROL METHOD THEREOF, AND PROJECTION SYSTEM

BACKGROUND OF THE INVENTION

Field of the Invention

This invention relates to a projection control apparatus and a control method thereof, as well as to a projection system, and particularly relates to techniques for adjusting a projection position.

Description of the Related Art

A projection method is known in which the projection ranges of multiple projection devices are caused to overlap (multi-projection). Multi-projection requires that the projection positions of the projection devices be aligned, and thus some known projection devices have functions for making such positioning easier. Japanese Patent Laid-open No. 2008-225297 discloses a method in an image display apparatus having a plurality of image display means, where one optical image is taken as a reference image and the positions at which the remaining optical images are formed are automatically adjusted so that the pixel positions in the remaining optical images correspond to the pixel positions in the reference image. In Japanese Patent Laid-open No. 2008-225297, the reference image is automatically set from among the plurality of optical images on the basis of conditions such as luminance, projection size, distortion, and so on.

Although not discussed in Japanese Patent Laid-open No. 2008-225297, the shape of an optical image will be distorted unless the image is projected from a straight-facing position, where the optical axis of the projection optical system and the projection plane are orthogonal to each other (called "keystone distortion"). Keystone correction is known as a function for correcting keystone distortion without altering the position of the projection device. Keystone correction can be achieved by, for example, deforming the projected image to cancel out keystone distortion. A method for setting the amount of keystone correction is known in which the coordinates of vertices of a projected optical image are moved while viewing the optical image, for example.

Applying keystone correction to an image repeatedly can affect the image quality, and thus it is better to apply keystone correction as few times as possible. Keystone correction on an optical image should therefore be canceled before determining the correction amount for positioning the other optical images relative to the reference image. However, if keystone correction has been applied to the reference image, that keystone correction should not be canceled.

However, thus far, there has not been a function for selectively and automatically canceling keystone correction applied to a plurality of optical images. It has thus been necessary to first cancel the keystone correction for all of the optical images and then reapply the keystone correction to the reference image. Furthermore, limitations on where the projector can be installed can also make it necessary to change the reference image. In this case, the keystone correction must be canceled and reapplied each time the reference image is changed, which is extremely complicated.

When the optical image is positioned automatically, an image of the projection plane is sometimes captured in order to obtain or recognize the projected areas of individual projectors. In such a case, if the image capturing conditions are not appropriate, it may not be possible to obtain or recognize the projected area from the images captured of the projection plane, or the accuracy of the recognized or obtained area may drop. It is conceivable, therefore, to carry out a test capture for determining image capturing conditions such as exposure conditions before the positioning (that is, a test capture for the purpose of confirming the image capturing conditions).

On the other hand, the projected area must be contained within an image capturing range (angle of view) in order to recognize the projected area from an image captured of the projection plane. It is thus conceivable to carry out a test capture for confirming that the projection ranges of all projectors to be positioned are contained within the image capturing range (a test capture for the purpose of confirming the angle of view).

To confirm the angle of view, it is sufficient to capture an image of the projection plane with all of the projectors in a projecting state. However, to confirm the image capturing conditions appropriate for the individual projectors, the projection plane must be captured with only a single projector in a projecting state. No systems have yet been provided for easily switching between and carrying out such a test capture.

Having been achieved in light of such issues with the past techniques, one aspect of this invention provides a projection control apparatus, a control method thereof, and a projection system capable of easily positioning a plurality of optical images on a projection plane.

Another aspect of this invention provides a projection control apparatus, a control method thereof, and a projection system that make it possible, using a method suited to the purpose, to easily carry out a test capture for an automatic alignment process during multi-projection.

SUMMARY OF THE INVENTION

According to an aspect of the present invention, there is provided a projection control apparatus that controls projection using a plurality of projection devices that project optical images onto a projection plane, the apparatus comprising at least one processor and/or at least one circuit to perform the operations of the following units: an obtaining unit configured to obtain a projected area of each of the plurality of projection devices on the basis of an image obtained by capturing the projection plane; and a control unit configured to execute a first adjustment process of adjusting the projected area of each projection device so as to cause the projected areas of other projection devices, among the plurality of projection devices, that are not a reference projection device, to correspond to the projected area of the reference projection device, wherein the control unit cancels geometric correction applied in the other projection devices before starting the first adjustment process and does not cancel geometric correction applied in the reference projection device before starting the first adjustment process.

According to another aspect of the present invention, there is provided a control method of a projection control apparatus that controls projection using a plurality of projection devices that project optical images onto a projection plane, the method comprising: obtaining a projected area of each of the plurality of projection devices on the basis of an image obtained by capturing the projection plane; and executing a first adjustment process of adjusting the projected area of each projection device so as to cause the projected areas of other projection devices, among the plurality of projection devices, that are not a reference projection device, to correspond to the projected area of the reference projection device, wherein executing the first adjustment process includes: canceling geometric correction applied in the other projection devices before starting the first adjustment process; and executing the first adjustment process without canceling geometric correction applied in the reference projection device before starting the first adjustment process.

According to a further aspect of the present invention, there is provided a projection system comprising: a plurality of projection devices; a projection control apparatus that controls projection using the plurality of projection devices, the projection control apparatus comprising at least one processor and/or at least one circuit to perform the operations of the following units: an obtaining unit configured to obtain a projected area of each of the plurality of projection devices on the basis of an image obtained by capturing the projection plane; and a control unit configured to execute a first adjustment process of adjusting the projected area of each projection device so as to cause the projected areas of other projection devices, among the plurality of projection devices, that are not a reference projection device, to correspond to the projected area of the reference projection device, wherein the control unit cancels geometric correction applied in the other projection devices before starting the first adjustment process and does not cancel geometric correction applied in the reference projection device before starting the first adjustment process; and an image capture apparatus that captures an image of the projection plane.

According to another aspect of the present invention, there is provided a non-transitory computer-readable recording medium storing instructions that can be executed by a processor included in a projection control apparatus that controls projection using a plurality of projection devices that project optical images onto a projection plane, the instructions, when executed by the processor, causing the processor to function as: an obtaining unit configured to obtain a projected area of each of the plurality of projection devices on the basis of an image obtained by capturing the projection plane; and a control unit configured to execute a first adjustment process of adjusting the projected area of each projection device so as to cause the projected areas of other projection devices, among the plurality of projection devices, that are not a reference projection device, to correspond to the projected area of the reference projection device, wherein the control unit cancels geometric correction applied in the other projection devices before starting the first adjustment process and does not cancel geometric correction applied in the reference projection device before starting the first adjustment process.

Further features of the present invention will become apparent from the following description of exemplary embodiments with reference to the attached drawings.

BRIEF DESCRIPTION OF THE DRAWINGS

FIGS. 6A and 6B are diagrams illustrating examples of GUI screens in a projection control application according to the embodiment.

FIGS. 11A to 11C are diagrams illustrating examples of test patterns according to the embodiment.

FIGS. 12A to 12D are diagrams illustrating an edge blending process.

DESCRIPTION OF THE EMBODIMENTS

An exemplary embodiment of the present invention will now be described in detail in accordance with the accompanying drawings. Note that this invention is not limited to the embodiment described below. Additionally, the constituent elements described in the embodiment are not all absolutely necessary in this invention. The individual function blocks in the embodiment can be realized by hardware, software, or a combination of hardware and software. Additionally, a single function block may be realized by multiple pieces of hardware. A single piece of hardware may realize multiple function blocks. One or more function blocks may be realized by one or more programmable processors (CPUs, MPUs, or the like) executing a computer program that consists of instructions or commands loaded into memory. When one or more function blocks are realized by hardware, the function blocks can be realized by discrete circuits, integrated circuits such as FPGAs or ASICs, or the like.

The following embodiment describes a configuration in which the invention is applied in a standalone-type projection device (projector). However, the invention can also be applied in a projector built into a typical electronic device, such as a personal computer, a smartphone, a tablet terminal, a game console, a digital (video) camera, or the like.

System Configuration of Present Embodiment

Figure 1:
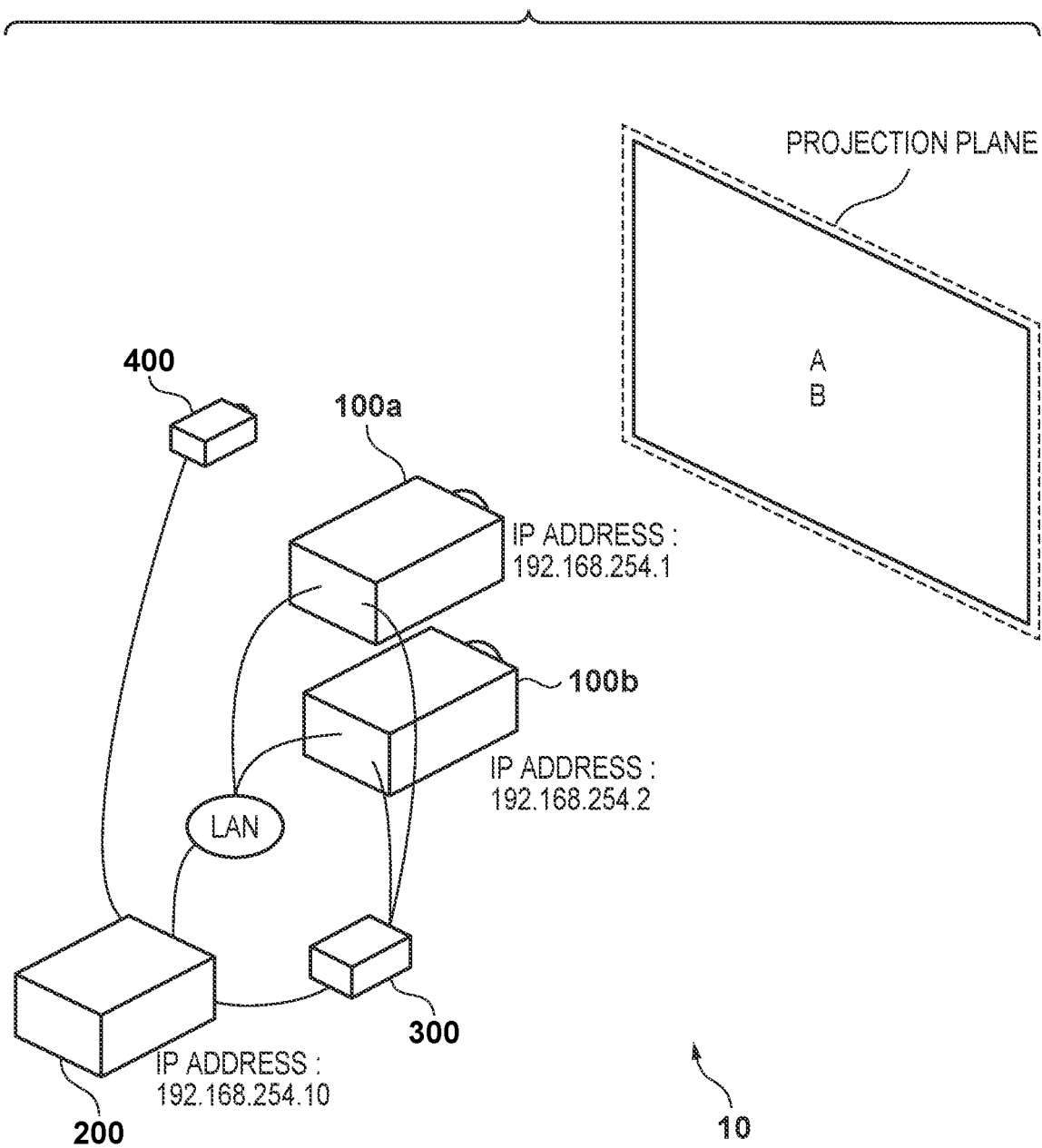
FIG. 1 is a schematic diagram illustrating an example of the configuration of a projection system that carries out stacked projection, according to an embodiment.

FIG. 1 is a schematic diagram illustrating an example of a projection system according to an embodiment of the invention. A projection system 10 carries out stacked projection, in which the projected areas of a plurality of projection devices ("projectors" hereinafter) are caused to correspond on a projection plane, in order to increase the dynamic range of an optical image, increase the luminance, or achieve a 3D display. Although FIG. 1 illustrates a projection system in which the minimum number of projectors (two), namely projectors 100a and 100b, are included, and projected areas A and B of the respective projectors are caused to correspond, the system may include three or more projectors.

All the projectors included in the projection system 10 can be communicatively connected to a personal computer (PC) 200 functioning as a projection control apparatus. The communication between the projectors and the projection control apparatus may be wired communication or wireless communication, and the communication protocol is not particularly limited. As one example, the present embodiment will describe the communication among the devices as taking place over a local area network (LAN) using the TCP/IP communication protocol. The PC 200 can control the operations of the projectors 100*a* and 100*b* by sending predetermined commands to the projectors 100*a* and 100*b*. The projectors 100*a* and 100*b* operate in response to the commands received from the PC 200, and send results of the operations to the PC 200.

A video distribution device 300 distributes video signals output by the PC 200 to the projectors 100*a* and 100*b*. The video distribution device 300 outputs the same video signals to all the connected projectors. Here, the configuration illustrated is a configuration employed during the adjustment, prior to projecting for viewing purposes. The video images to be projected by the individual projectors for viewing are supplied to the individual projectors separately from a playback device or the like. Note that the video signals may be supplied from the PC 200 directly to the projectors 100*a* and 100*b*. Also, the video signals can be transferred in accordance with a generally-used display interface standard. HDMI (registered trademark), DVI, VGA, and so on are examples of standards that can be used.

The projection system 10 further includes an image capture apparatus 400 such as a digital camera. The image capture apparatus 400 is assumed to be installed in a location facing straight toward the projection plane, so as to include the entire projection plane as an image capturing range. The image capture apparatus 400 can be communicatively connected to the PC 200 directly or over the LAN. The PC 200 can control the operations of the image capture apparatus 400 by sending predetermined commands to the image capture apparatus 400. For example, the image capture apparatus 400 can capture images in response to requests from the PC 200 and send the obtained image data to the PC 200.

Figure 2:
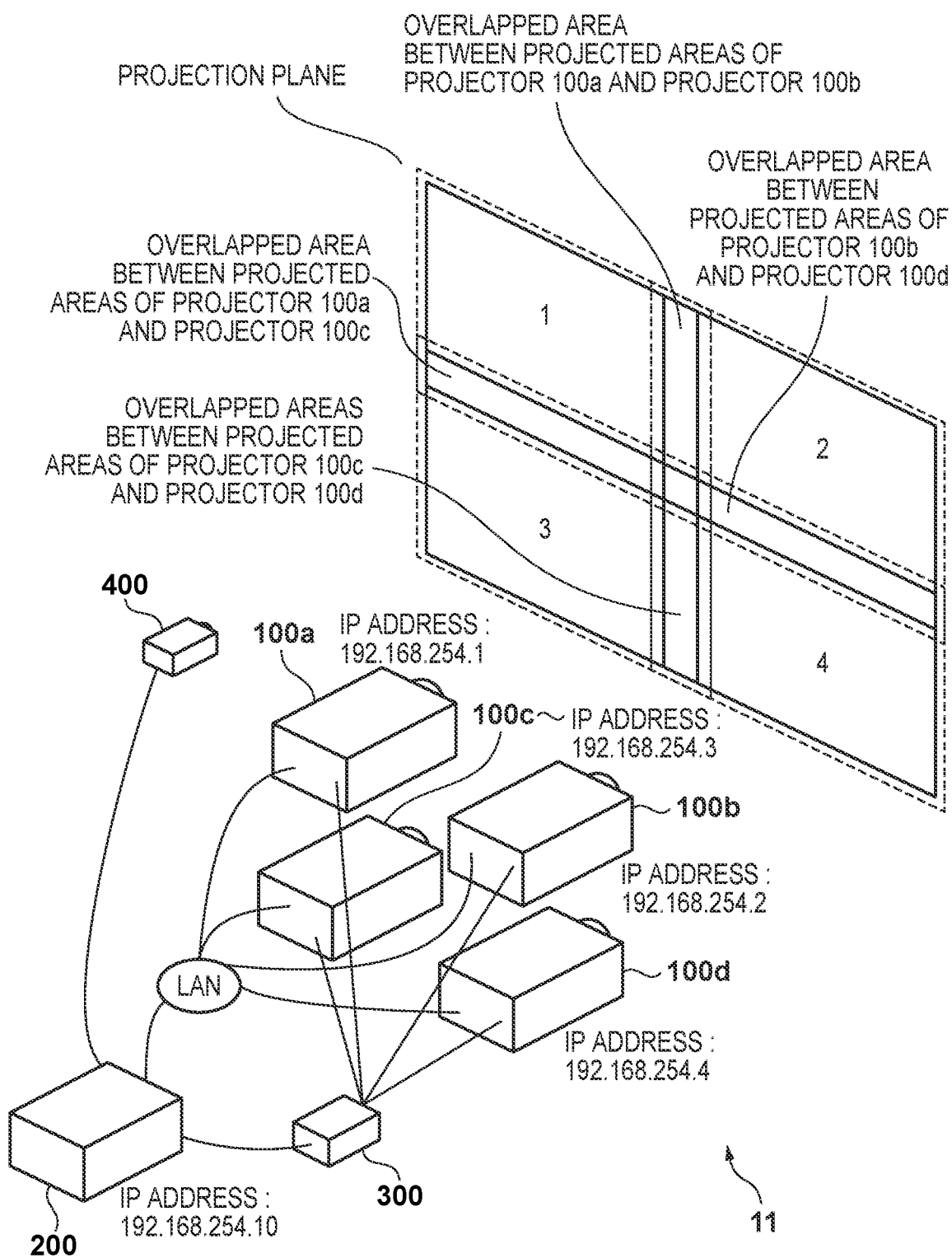
FIG. 2 is a schematic diagram illustrating an example of the configuration of a projection system that carries out multi-screen projection, according to the embodiment.

FIG. 2 is a schematic diagram illustrating another example of the configuration of a projection system according to the embodiment of the invention, where constituent elements that are the same as those in FIG. 1 are assigned the same reference numerals. A projection system 11 carries out multi-screen projection, in which an optical image having a resolution (number of pixels) too high to be projected by a single projector is achieved by arranging optical images projected by individual projectors along a projection plane. In the configuration illustrated in FIG. 2, too, the video distribution device 300 outputs the same video signals to all the connected projectors. The video images to be projected by the individual projectors for viewing are supplied to the individual projectors separately from a playback device or the like.

Although FIG. 2 illustrates a projection system including four projectors, namely projectors 100*a* to 100*d*, the system may include more projectors. In multi-screen projection, adjacent projected areas, among projected areas 1 to 4 of the projectors 100*a* to 100*d*, are caused to partially overlap to ensure that the boundaries between individual optical images do not stand out. Light reduction processing (an edge blending process) is also carried out to ensure that an increase in luminance at the overlapping parts does not stand out. Note that in the following descriptions, "projector 100" may refer collectively to all of the plurality of projectors or to a given one of the projectors.

Terms used in this specification will be defined next.

"Projected area" is a region of the projection plane occupied by the optical image projected by the projector 100.

"Projected image" is an optical image projected in the projected area.

"Image for projection" is an image expressed by a video signal or image data output by the PC 200.

"Multi-projection" is projection using a plurality of projection devices.

"Stacked projection" is multi-projection in which the projected areas correspond or the projected images overlap completely.

"Multi-screen projection" is multi-projection in which the projected areas are arranged so that adjacent projected areas partially overlap.

"Projector (projection device)" is a device that forms a projected image on a projection plane by modulating light from a light source on the basis of an image for projection and projecting onto a projection plane or scanning a projection plane.

Configuration of Projector 100

Figure 3:
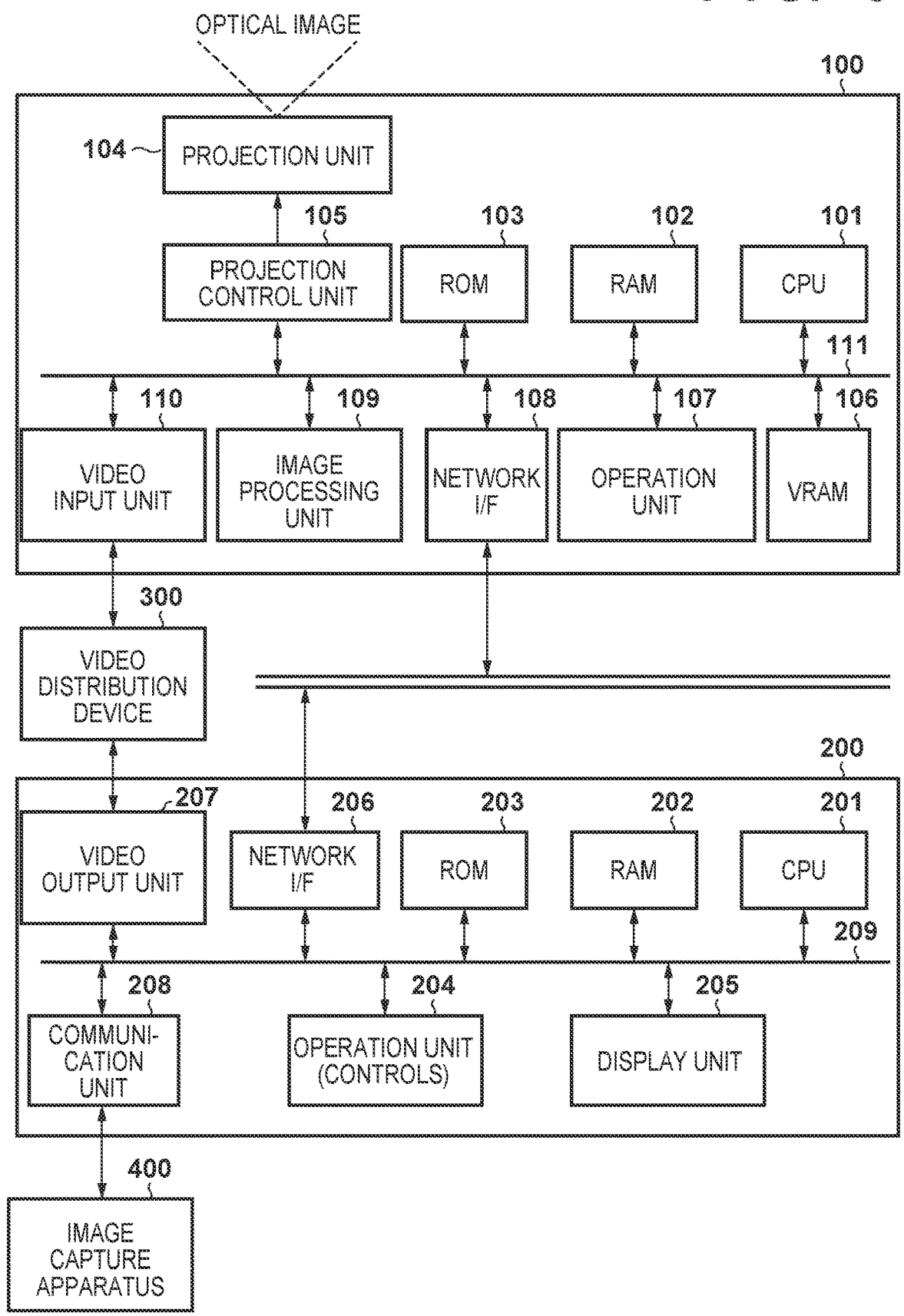
FIG. 3 is a block diagram illustrating an example of the functional configuration of a projection system according to the embodiment.

FIG. 3 is a block diagram illustrating an example of the functional configurations of the projector 100 and the PC 200 included in the projection system 10 or 11. The projector 100 includes a CPU 101, RAM 102, ROM 103, a projection unit 104, a projection control unit 105, VRAM 106, an operation unit 107, a network IF 108, an image processing unit 109, and a video input unit 110. These function blocks are communicatively connected by an internal bus 111.

The CPU 101 is an example of a programmable processor, and realizes the operations of the projector 100 by, for example, loading a program that consists of instructions or commands and is stored in the ROM 103 into the RAM 102 and executing the programs.

The RAM 102 is used as work memory when the CPU 101 executes programs. The RAM 102 stores programs, variables used when executing programs, and so on. The RAM 102 may be used for other applications as well (e.g., as a data buffer).

The ROM 103 may be rewritable. The ROM 103 stores programs executed by the CPU 101, GUI data for use in the display of items such as menu screens, test pattern data used in keystone correction, positioning processing, and so on, various types of setting values, and the like.

The projection unit 104 includes a light source, a projection optical system, and the like, and projects an optical image on the basis of an image for projection supplied from the projection control unit 105. In the present embodiment, using a liquid crystal panel as an optical modulation element, an optical image based on the image for projection is generated and projected onto the projection plane through the projection optical system by controlling the reflectance or transmittance of light from the light source in accordance with the image for projection.

The projection control unit 105 supplies data of the image for projection, which has been supplied from the image processing unit 109, to the projection unit 104.

The VRAM 106 is video memory storing data of the image for projection received from the PC 200.

The operation unit 107 includes input devices such as keys, buttons, switches, a touch panel, or the like, and accepts instructions made to the projector 100 by a user. The CPU 101 monitors the operations of the operation unit 107, and upon detecting an operation made through the operation unit 107, executes processing in accordance with the detected operation. If the projector 100 includes a remote controller, the operation unit 107 communicates operation signals received from the remote controller to the CPU 101.

The network IF 108 is an interface for connecting the projector 100 to a communication network, and has a configuration compliant with the supported communication network standard. In the present embodiment, the projector 100 is connected through the network IF 108 to a local network shared with the PC 200. Accordingly, the communication between the projector 100 and the PC 200 is carried out through the network IF 108.

The image processing unit 109 applies various types of image processes as necessary to video signals supplied to the video input unit 110 and stored in the VRAM 106, and supplies the resulting signals to the projection control unit 105. The image processing unit 109 may be a microprocessor for image processing, for example. Alternatively, functions corresponding to the image processing unit 109 may be realized by the CPU 101 executing programs stored in the ROM 103.

The image processing that can be applied by the image processing unit 109 includes frame thinning, frame interpolation, resolution conversion, processes for superimposing OSDs such as menu screens, keystone correction, edge blending, and so on, but is not limited thereto.

The video input unit 110 is an interface that directly or indirectly receives the video signals output by an external device (the PC 200, in the present embodiment), and has a configuration corresponding to the supported video signal. The video input unit 110 includes, for example, one or more of a composite terminal, an S-video terminal, a D terminal, a component terminal, an analog RGB terminal, a DVI-I terminal, a DVI-D terminal, and an HDMI (registered trademark) terminal. If an analog video signal has been received, the video input unit 110 converts that signal into a digital video signal and stores the signal in the VRAM 106.

Configuration of PC 200

The functional configuration of the PC 200 will be described next. The PC 200 may be a generic computer to which an external display can be connected, and thus has a functional configuration corresponding to that of a generic computer. The PC 200 includes a CPU 201, RAM 202, ROM 203, an operation unit 204, a display unit 205, a network IF 206, a video output unit 207, and a communication unit 208. These function blocks are communicatively connected by an internal bus 209.

The CPU 201 is an example of a programmable processor, and realizes the operations of the PC 200 by, for example, loading programs (an OS, application programs, and the like) that consist of instructions or commands and are stored in the ROM 203 into the RAM 202 and executing the programs.

The RAM 202 is used as work memory when the CPU 201 executes programs. The RAM 202 stores programs, variables used when executing programs, and so on. The RAM 202 may be used for other applications as well (e.g., as a data buffer).

The ROM 203 may be rewritable. The ROM 203 stores programs executed by the CPU 201, GUI data for use in the display of items such as menu screens, various types of setting values, and the like. Note that the PC 200 may include a storage device having a higher capacity than the ROM 203 (e.g., an HDD or an SSD), in which case large programs such as the OS, application programs, and so on may be stored in the storage device.

The operation unit 204 includes an input device such as a keyboard, a pointing device (e.g., a mouse), a touch panel, switches, and the like, and accepts instructions for the PC 200 from a user. Note that the keyboard may be a software keyboard. The CPU 201 monitors the operations of the operation unit 204, and upon detecting an operation made through the operation unit 204, executes processing in accordance with the detected operation.

The display unit 205 is a liquid crystal panel, an organic EL panel, or the like. The display unit 205 displays screens provided by the OS, application programs, and the like. Note that the display unit 205 may be an external device. The display unit 205 may also be a touch display.

The network IF 206 is an interface for connecting the PC 200 to a communication network, and has a configuration compliant with on the supported communication network standard. In the present embodiment, the PC 200 is connected through the network IF 206 to a local network shared with the projector 100. Accordingly, the communication between the PC 200 and the projector 100 is carried out through the network IF 206.

The video output unit 207 is an interface that sends video signals to an external device (in the present embodiment, the projector 100 or the video distribution device 300), and has a configuration corresponding to the supported video signals. The video output unit 207 includes, for example, one or more of a composite terminal, an S-video terminal, a D terminal, a component terminal, an analog RGB terminal, a DVI-I terminal, a DVI-D terminal, and an HDMI (registered trademark) terminal.

Although the present embodiment assumes that the UI screen of a projection control application program having a function for adjusting the projected area of the projector 100 is displayed in the display unit 205, the UI screen may be displayed in an external device connected to the video output unit 207.

The communication unit 208 is a communication interface for carrying out serial communication, for example, with an external device. A USB interface is a typical example, but the configuration may be compliant with another standard such as RS-232C. Although the present embodiment assumes that the image capture apparatus 400 is connected to the communication unit 208, the method of communication between the image capture apparatus 400 and the PC 200 is not particularly limited. Communication compliant with any desired standard that is supported by both these elements can be employed.

Video Distribution Device 300

The PC 200, which in the present embodiment is a projection control apparatus, positions an image for viewing for the individual projectors prior to multi-projection. Accordingly, the video signals sent from the PC 200 to the individual projectors are test video signals (test patterns). The video signals projected for viewing are supplied to the individual projectors separately. The present embodiment assumes that the video distribution device 300 outputs the same video signal to all of the connected projectors in parallel.

Keystone Correction

Keystone correction will be described next with reference to FIG. 4. Keystone correction is correction (geometric correction) that geometrically converts (deforms) an original image in accordance with skew between the normal direction of the projection plane and a projection direction (typically the optical axis of the projection optical system)

so as to cancel out keystone distortion arising in the projected image. The geometric conversion of the image can be realized through projective conversion, and thus the keystone correction is equivalent to determining projective conversion parameters, which correspond to the amount of geometric correction. For example, the CPU 101 can determine the projective conversion parameters on the basis of a movement amount and movement direction of each of vertices of a rectangular original image, and supply the parameters to the image processing unit 109.

Assuming, for example, that the coordinates of the original image are (xs,ys), coordinates (xd,yd) of a deformed image obtained through the projective conversion are expressed through the following Formula 1.

$$\begin{pmatrix} xd \\ yd \\ 1 \end{pmatrix} = M \begin{pmatrix} xs - xso \\ ys - yso \\ 1 \end{pmatrix} + \begin{pmatrix} xdo \\ ydo \\ 0 \end{pmatrix} \quad \text{(Formula 1)}$$

Figure 4:
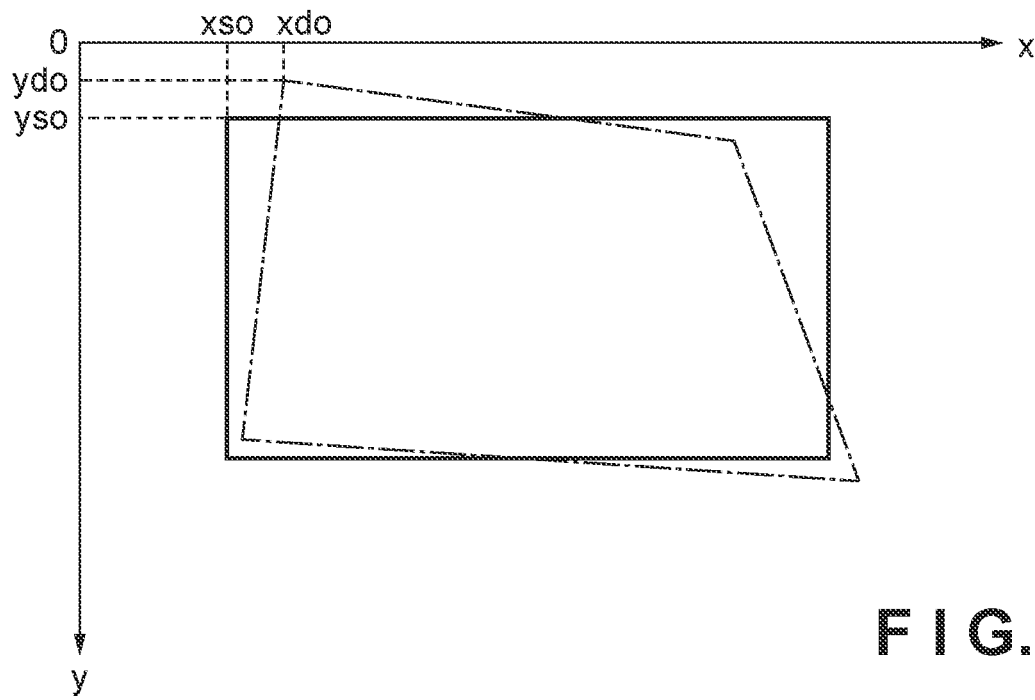
FIG. 4 is a diagram illustrating keystone correction.

Here, M represents a 3×3 matrix that is a projective conversion matrix for converting from the original image to the deformed image. xso and yso are coordinates of the upper-left vertex of the original image, indicated by a solid line in FIG. 4; and xdo and ydo are coordinate values of a vertex in the deformed image, indicated by a dot-dash line in FIG. 4, which corresponds to the vertex (xso,yso) in the original image.

The CPU 101 supplies the matrix M of Formula 1 along with a corresponding inverse matrix $M^{-1}$ to the image processing unit 109 along with an offset (xso,yso), (xdo,ydo) as the keystone correction parameters. The image processing unit 109 can find the coordinates (xs,ys) in the original image which correspond to the post-keystone correction coordinate values (xd,yd) using the following Formula 2.

$$\begin{pmatrix} xs \\ ys \\ 1 \end{pmatrix} = M^{-1} \begin{pmatrix} xd - xdo \\ yd - ydo \\ 1 \end{pmatrix} + \begin{pmatrix} xso \\ yso \\ 0 \end{pmatrix} \quad \text{(Formula 2)}$$

If both of the coordinates xs,ys in the original image obtained through Formula 2 are integers, the image processing unit 109 can use the pixel values at the original image coordinates (xs,ys) as the pixel values at the coordinates (xd,yd) in the keystone-corrected image as is. However, if the coordinates in the original image obtained through Formula 2 are not integers, the image processing unit 109 can find the pixel values corresponding to the original image coordinates (xs,ys) through an interpolation process using the values of a plurality of neighboring pixels. A known interpolation process such as bilinear, bicubic, or the like can be used for the interpolation process. Note that if the coordinates in the original image obtained through Formula 2 are coordinates of a region outside the original image, the image processing unit 109 sets the pixel values of the coordinates (xd,yd) in the keystone-corrected image to black (0) or a user-designated background color. In this manner, the image processing unit 109 can create the converted image by finding the pixel values for all the coordinates in the keystone-corrected image.

Although it is assumed here that both the matrix M and the inverse matrix $M^{-1}$ are supplied from the CPU 101 of the projector 100 to the image processing unit 109, it is also possible to supply only one of these matrices and have the image processing unit 109 calculate the other of the matrices.

Pixel interpolation is normally involved in keystone correction, and thus pixel information of the original image (RGB values or the like) is lost, particularly when there is a large amount of deformation. Applying a small amount of keystone correction (a small amount of geometric correction) is thus better from the standpoint of image quality.

Note that the coordinates of the vertices in the keystone-corrected image can be obtained by, for example, allowing a user to input a movement amount through the operation unit 107 for each of the vertices in the projected image, so that the vertices are projected at the desired positions. At this time, the CPU 201 may use a function of the projection control application program to cause the projector 100 to project a test pattern in order to assist in the input of the movement amount.

Overview of Automatic Alignment Process

Figure 5:
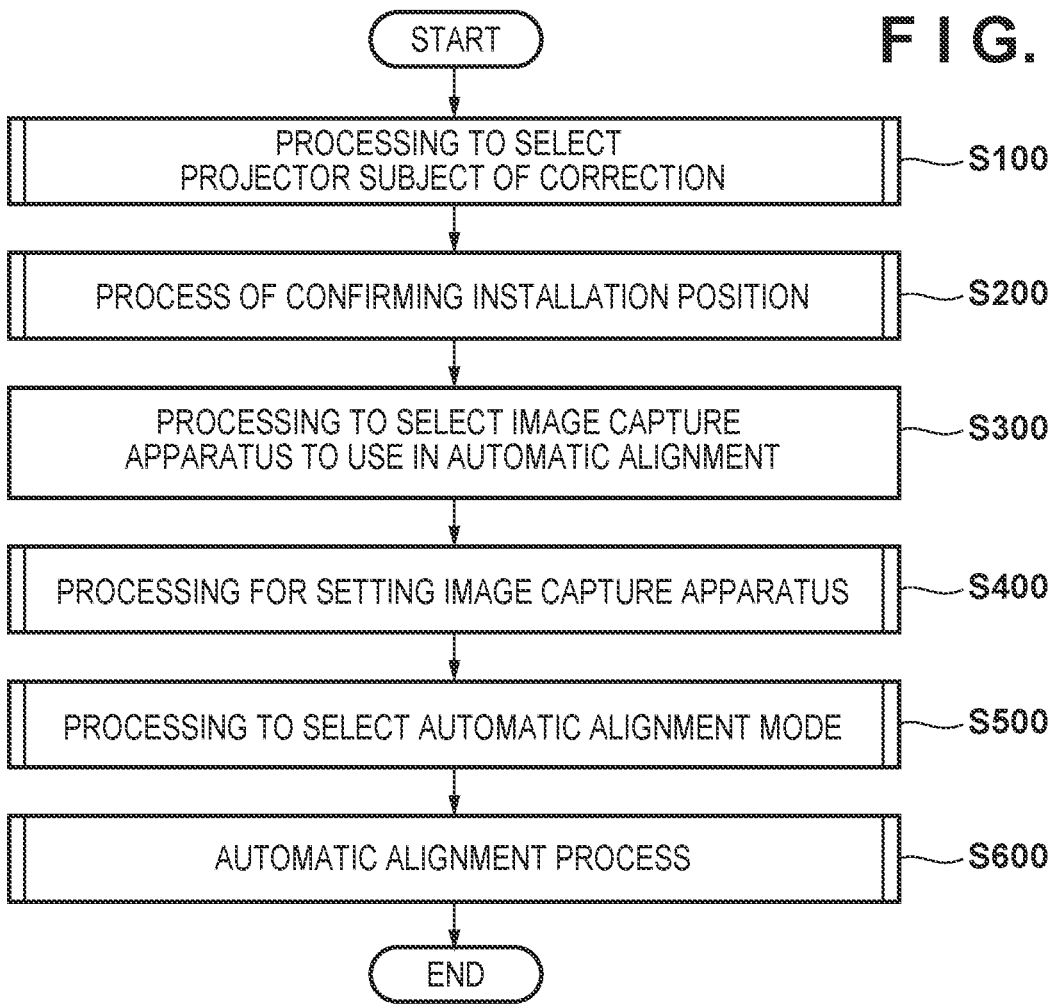
FIG. 5 is a flowchart illustrating an overview of an automatic alignment process according to the embodiment.

The flowchart in FIG. 5 illustrates an overview of an automatic alignment process realized by the PC 200 according to the present embodiment executing the projection control application program.

In S100, the CPU 201 selects, from among the projectors 100 with which the PC 200 can communicate, a plurality of projectors to be subject of the automatic alignment process (subject of adjustment). The plurality of selected projectors are one projector to project a reference image, and one or more projectors to project optical images to be positioned with respect to the reference image. As will be described later, for example, a list of projectors that can be communicated with may be displayed in a selectable matter in the display unit 205, and the user may be allowed to select a plurality of projectors to undergo the automatic alignment process. The reference projector may be selected explicitly by the user, or may be selected automatically. If the reference projector is selected automatically, it is conceivable to use the projector displayed at the top of the list of selected projectors as the reference projector, for example. Once the user has entered an instruction to complete the selection, for example, the CPU 201 moves the process to S200.

In S200, the CPU 201 sends a command instructing a predetermined test pattern to be projected to the projectors 100 selected in S100 through the network IF 206. The CPU 101 of the projector 100 that has received the command reads out test pattern data from the ROM 103 and, using the projection control unit 105, causes the projection unit 104 to project an optical image of the test pattern. The test pattern projected here is a test pattern for enabling the user to understand the positional relationships between the projected areas of the individual projectors 100, distortion in the projected images, and so on. The pattern may be a grid (mesh) pattern or the like, for example.

Based on the projected test pattern, the user can understand whether or not the projected areas of the selected projectors 100 are generally in the correct positions. The range that can be adjusted by the automatic alignment function is limited, and thus at this point in time, the user adjusts the placement positions, projection magnifications, and so on of the projectors 100, for example, so that the projected areas of the individual projectors 100 are generally in the desired positions.

On the other hand, in S300, the CPU 201 displays, in the display unit 205, the image capture apparatuses connected to the PC 200 in a selectable manner along with a message prompting the user to make a selection. Here, only the image capture apparatus 400 is usable, and thus the image capture apparatus 400 is displayed in a selected state. When an instruction to capture a test image is detected through the operation unit 204 while the image capture apparatus in a selected state, the CPU 201 moves the process to S400.

In S400, the CPU 201 sets image capturing conditions (angle of view, exposure conditions, white balance, and the like) for the image capture apparatus 400 selected in S300. The exposure conditions, white balance, and so on can be set manually or automatically. The settings can be made directly, or remotely from the PC 200, by the user manipulating the image capture apparatus 400, using the operation unit 204 to operate a GUI provided by the projection control application, or the like. If the settings are made manually, the same exposure conditions and white balance are used for all the projectors. The angle of view of the image capture apparatus 400 can be changed in the same manner as when manually setting the exposure conditions, white balance, and so on. The process of S400 will be described in detail later.

In S500, the CPU 201 displays a list of automatic alignment processes in a selectable manner in the display unit 205. This will be described in detail later. The CPU 201 moves the process to S600 upon detecting an instruction for executing the automatic alignment process, made by operating a GUI provided by the projection control application.

In S600, the CPU 201 executes the selected automatic alignment process. For stacked projection, for example, the CPU 201 executes a process that automatically positions the projected areas of the projectors selected in S300. The process that automatically positions the projected areas of the projectors selected in S300 will be described in detail later.

Note that the order in which the above-described S100 to S600 are executed may be different from that shown in FIG. 5. With respect to the process for automatically positioning the projected areas of the projectors, for example, it is sufficient for the selection of the target projectors, the selection of the image capture apparatus 400, and the setting of the image capturing conditions to be completed by the point in time when the instruction to start automatic alignment process has been made. For example, the projector settings (S100, S200) may be carried out after the processing pertaining to the image capture apparatus 400 (S300, S400).

Figure 6A:
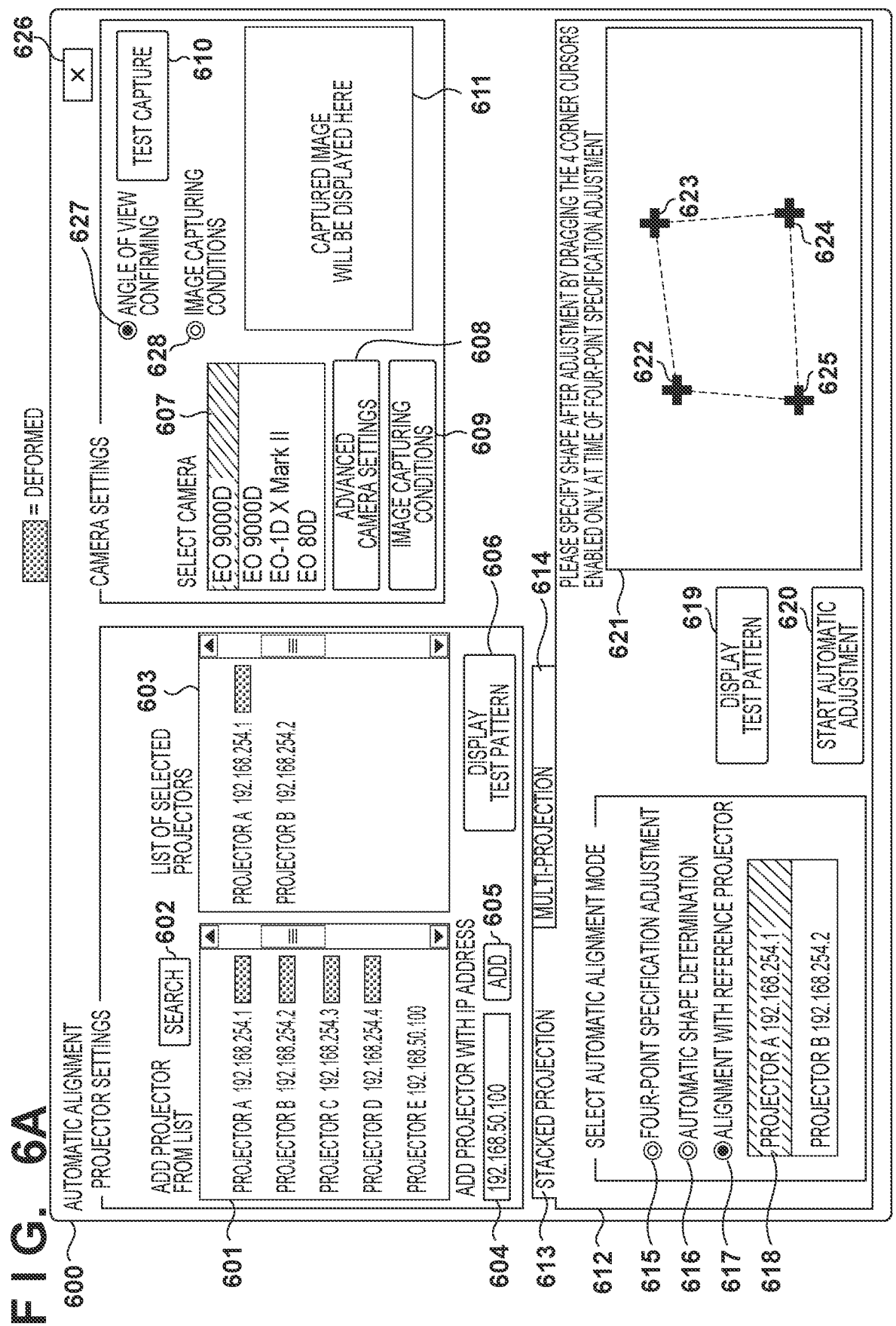

FIGS. 6A and 6B are diagrams illustrating an example of a GUI screen 600 displayed in the display unit 205 by the CPU 201 executing the projection control application program. The user operates the GUI screen 600 through the operation unit 204 of the PC 200. Note that FIGS. 6A and 6B are the same, aside from one illustrating a display pertaining to stacked projection in the lower part of the GUI screen 600, and the other illustrating a display pertaining to multi-screen projection in the lower part of the GUI screen 600.

A list view 601 is a region in which a list of information of the projectors 100 connected to the PC 200 over the network is displayed in a selectable manner. In the present embodiment, projector names, IP addresses, and whether or not keystone correction is currently applied are displayed as a list in the list view 601. This information can be obtained from the projectors 100 by the CPU 201 sending information obtainment commands to each of the projectors 100. In the present embodiment, a projector for which keystone correction is currently applied is indicated as "deformed", whereas a projector for which keystone correction is not applied is indicated as "no deformation" or has no indication at all.

Upon the operation of a search button 602 being detected, the CPU 201 of the PC 200 broadcasts a predetermined command requesting projector names, IP addresses, and information pertaining to whether or not keystone correction is applied, over the network through the network IF 206. Upon receiving the command through the network IF 108, the CPU 101 of each projector 100 connected to the network sends, to the PC 200, data including that projector's name, IP address, and information pertaining to whether or not keystone correction is applied. The CPU 201 of the PC 200 receives the data sent in response to the command, extracts the information included in the data, and displays a list of this information in the list view 601.

A list view 603 is a region displaying a list of projectors, among the list of projectors displayed in the list view 601, that have been selected as targets for automatic alignment. For example, when a user operation of dragging and dropping one or more elements from the list displayed in the list view 601 to the list view 603 has been detected, the CPU 201 adds the element that was subjected of the operation to the list view 603. The projector information displayed in the list view 603 is managed in the RAM 202 by the CPU 201. Note that the CPU 201 also adds elements to the list view 603 in response to an add button 605 (described later) being manipulated.

A text box 604 and the add button 605 are parts of the GUI through which the user specifies a projector to be added for automatic alignment using the IP address of the projector, and then adds the projector. Upon detecting that the add button 605 has been manipulated, the CPU 201 adds the projector having the IP address entered in the text box 604 to the list view 603 and the list of projectors managed by the RAM 202. The process of adding elements to the list view 603 corresponds to the above-described process of S100.

Figure 7:
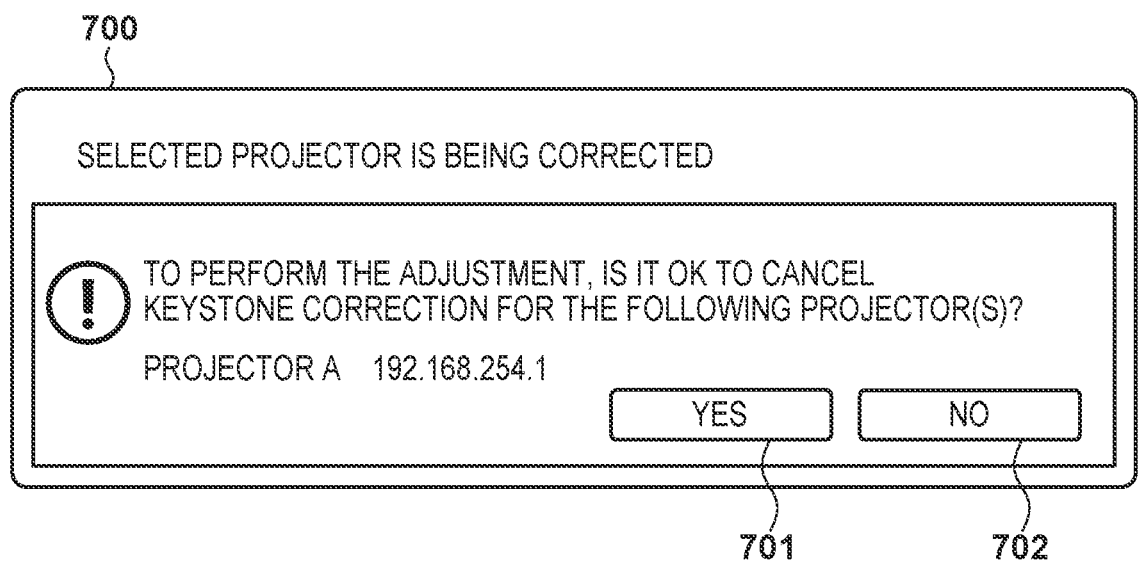
FIG. 7 is a diagram illustrating an example of a GUI screen in the projection control application according to the embodiment.

In the present embodiment, if keystone correction is currently applied in a projector added to the list view 603, a projector selected in the list view 603, or the like, the CPU 201 can notify the user thereof. The notification that keystone correction is currently applied in a selected projector can be made by, for example, displaying a warning screen 700 (illustrated in FIG. 7) in the display unit 205. In other words, the warning screen 700 is a notification screen for allowing the user to select whether or not to cancel geometric correction such as keystone correction when such geometric correction is applied in a projector selected as a target for automatic alignment. In addition to displaying the warning screen 700, when making the notification, the CPU 201 may send a command for projecting a predetermined test pattern to the corresponding projector. As a result, the test pattern is projected from the projector 100 that is the target of the notification. The user can therefore use the projected test pattern to confirm the position of the projected area of the projector for which the notification was made.

When an operation of a "yes" button 701 in the warning screen 700 has been detected, the CPU 201 sends a command requesting the amount of keystone correction (geometric correction) currently applied in the corresponding projector 100 via the network IF 206. In response to the command, the CPU 101 obtains the amount of keystone correction currently applied from, for example, the RAM 102, and sends that amount to the PC 200. Upon receiving the correction amount, the CPU 201 stores the correction amount as information of the corresponding projector in the list managed by the RAM 202. The CPU 201 furthermore sends a command instructing the keystone correction to be canceled to that projector 100. Upon receiving a command instructing the keystone correction to be canceled, the CPU 101 of the projector 100 instructs the image processing unit 109 to cancel the keystone correction. The CPU 201 closes the warning screen 700 after sending the command instructing the keystone correction to be canceled. Then, the CPU 201 removes the indication of "deformed" displayed in the list views 601 and 603 for the projector for which the keystone correction was canceled (or changes the indication to "no deformation"). The CPU 201 also updates the information, indicating whether or not keystone correction is applied, in the projector list managed by the RAM 202.

On the other hand, when an operation of a "no" button 702 in the warning screen 700 has been detected, the CPU 201 closes the warning screen 700 without communicating with the corresponding projector 100. Note that when an operation of the "no" button 702 in the warning screen 700 has been detected, the CPU 201 may store the selected projector as a reference projector candidate in the RAM 202. Accordingly, the display of the list views 601 and 603, the projector list in the RAM 202, and so on remain unchanged. Note that the display of the warning screen 700 when a projector is added to the list view 603, the operations of canceling the keystone correction, and so on are not absolutely necessary.

Returning to FIG. 6A, when an operation of a "test pattern display" button 606 is detected, the CPU 201 sends, via the network IF 206, a command instructing a test pattern to be displayed, to each of the projectors 100 displayed in the list view 603. This corresponds to the process of S200 in FIG. 5. The test pattern displayed in response to the button 606 being operated is a test pattern for making it easy to confirm the size, position, and so on of the display region of each projector 100, and may be a test pattern illustrated in FIG. 8A, FIG. 8B, or the like, for example. The two test patterns differ in terms of the displays (e.g., colors) of rectangular parts 801 and 802 in the four corners.

The test pattern may be sent from the PC 200 to the individual projectors 100 in association with a command to instruct the test pattern to be displayed, or may be generated by the CPU 101 of each projector 100.

Note that the test pattern can be generated so that the size of the rectangular part 801 or 802 in the test pattern displayed by the individual projector expresses upper limit values of the keystone correction for that projector. For example, assume that the upper limit values for keystone correction in a given projector 100 are 250 pixels in the X direction and 200 pixels in the Y direction. In this case, the test pattern can be generated so that the rectangular parts 801 of the test pattern displayed for that projector 100 have a horizontal width of 250 pixels and a vertical width of 200 pixels.

When such a test pattern is generated by the PC 200, the CPU 201 obtains the upper limit values for the keystone correction from the individual projectors 100 displayed in the list view 603. However, rather than directly obtaining the upper limit values for the keystone correction, other information that can be converted into the upper limit values for the amount of keystone correction (e.g., a firmware version and a model name) may be obtained instead. In this case, the obtained information is stored in the ROM 203 of the PC 200 as information for converting to the upper limit values for the amount of keystone correction (e.g., a lookup table). The CPU 201 then generates image data expressing the above-described test pattern on the basis of the obtained upper limit values for the keystone correction.

On the other hand, if the individual projectors 100 generate the test patterns, each CPU 101 generates image data expressing the above-described test pattern on the basis of information stored in the ROM 103 of that projector 100, for example. Note that the above-described test pattern may be stored in the ROM 103 in advance.

For example, expressing the rectangular parts of the test patterns projected by the individual projectors in different ways (e.g., with different colors, different fill patterns, or the like), makes it possible to assist in determining, on the basis of the projected test patterns, whether or not automatic alignment is possible with the current projector arrangement. For example, the rectangular parts 801 of the test pattern in FIG. 8A are assumed to be red, whereas the rectangular parts 802 of the test pattern in FIG. 8B are assumed to be green. The projectors 100a and 100b are furthermore assumed to project separate test patterns.

In this case, if the two test patterns are projected in a positional relationship so that the rectangular parts thereof overlap, the overlapping regions of the rectangular parts will appear yellow. Among the rectangular parts of the test patterns, the overlapping regions of the rectangular parts in corresponding positions are regions having vertices that can be moved through keystone correction in any of the projectors. Accordingly, it can be seen that if the projected images of the test patterns have overlapping regions in all of the rectangular parts in corresponding positions (upper-left, upper-right, lower-left, and lower-right), the projected areas of the projectors projecting those test patterns can be aligned (that is, that stacked projection is possible). Additionally, the upper limit for keystone correction of the projector projecting a test pattern can be understood from the rectangular parts of the projected image of that test pattern.

Figure 8C:
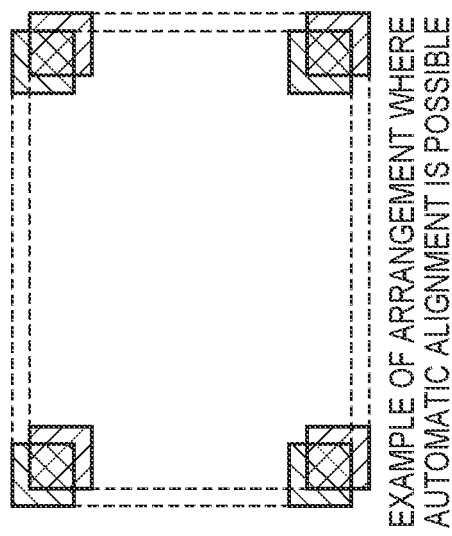
FIGS. 8A to 8D are diagrams illustrating examples of test patterns according to the embodiment.
Figure 8D:
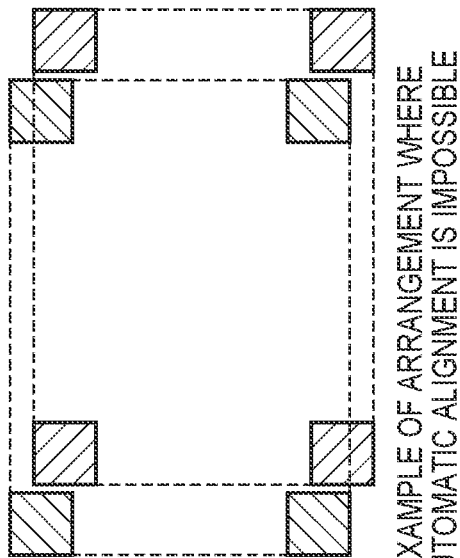
Figure 8A:
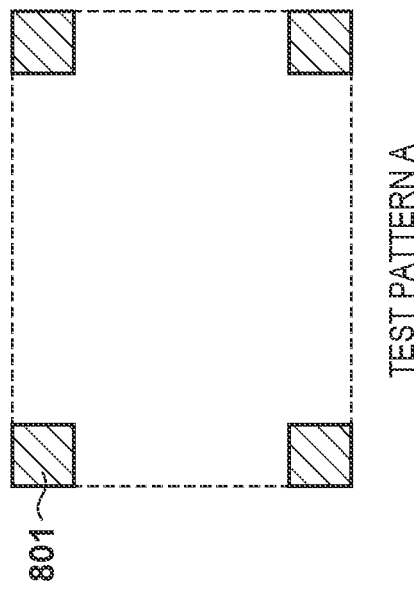
Figure 8B:
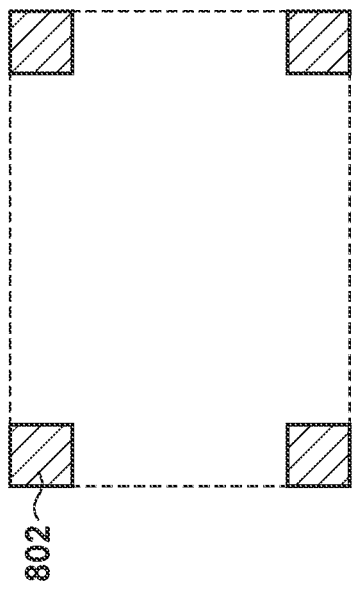

For example, if the projected images of the test patterns projected by the projectors 100a and 100b are in a positional relationship such as that illustrated in FIG. 8C, it can be seen that the projected areas of the projectors 100a and 100b can be automatically positioned. However, if the projected images of the test patterns have a positional relationship such as that illustrated in FIG. 8D, the projected areas cannot be automatically positioned with the current arrangement of the projectors 100a and 100b. In this case, the user can move at least one of the projectors 100a and 100b so that all of the corresponding rectangular parts in the projected images of the test patterns have overlapping regions (yellow regions). Additionally, the user can use a lens shift function to move the projection position of at least one of the projectors 100a and 100b so that all of the corresponding rectangular parts in the projected images of the test patterns have overlapping regions (yellow regions).

Returning to FIG. 6A, a list view 607 of the GUI screen 600 displays a list of the image capture apparatuses currently connected to the PC 200 so that one can be selected. The image capture apparatus selected here is used in the automatic alignment. Although the example of FIG. 6A illustrates four image capture apparatuses as being displayed in the list view 607, only the image capture apparatus 400 is connected in the present embodiment. As such, the image capture apparatus 400 is displayed in a selected state (a highlighted state).

Through the communication unit 208, the CPU 201 establishes communication with the image capture apparatus selected in the list view 607 for remotely controlling the image capture apparatus from the PC 200 (this corresponds to the process of selecting an image capture apparatus, indicated by S300). This makes it possible to obtain various types of information from the selected image capture apparatus, instruct images to be captured, obtain image data created by capturing images, set (change) image capturing conditions, and so on. The CPU 201 stores the information obtained from the image capture apparatus in the RAM 202.

Figure 9:
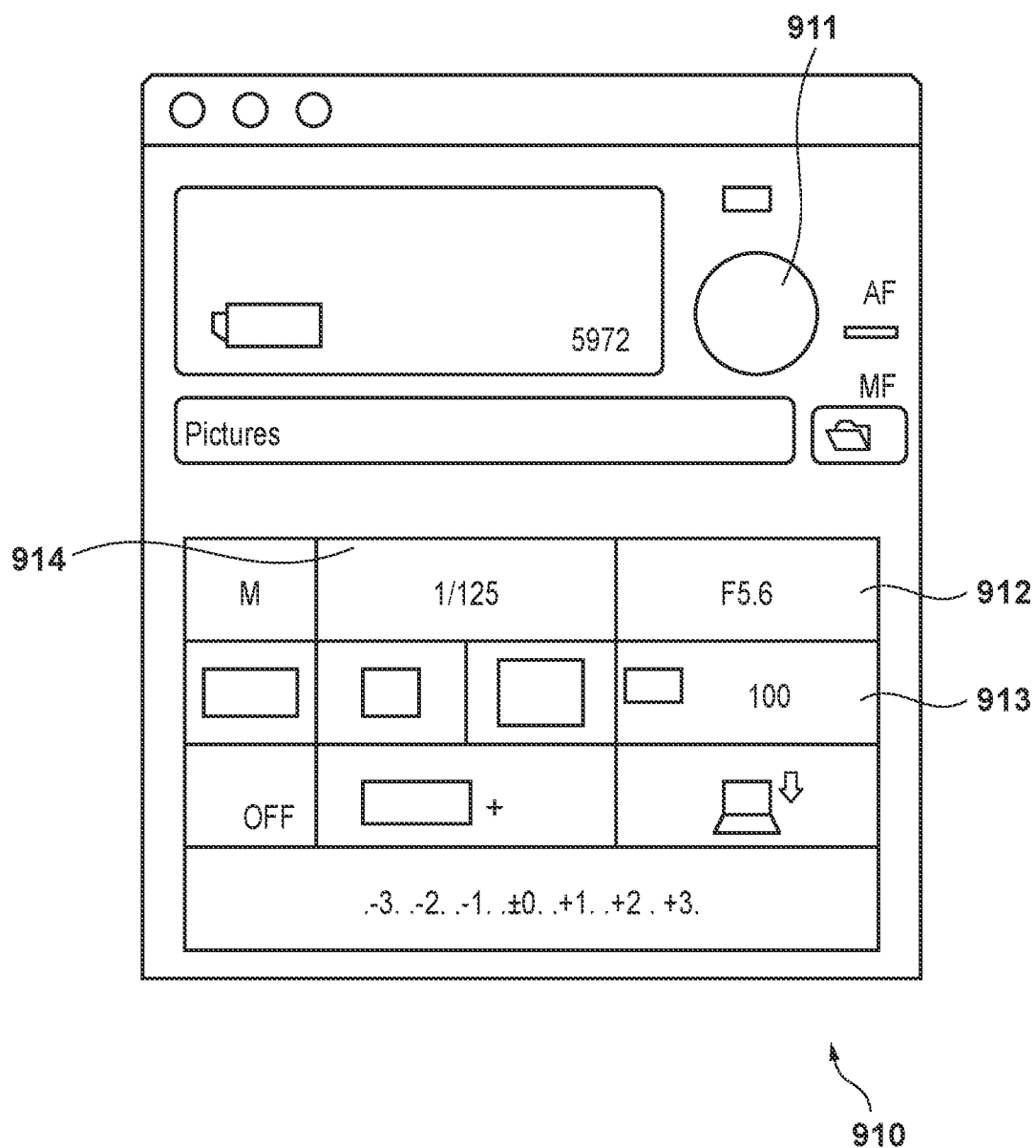
FIG. 9 is a diagram illustrating an example of a remote setting GUI screen in the projection control application according to the embodiment.

Returning to FIG. 6A, when an operation of an "advanced camera settings" button 608 is detected, the CPU 201 displays, in the display unit 205, a GUI screen for remotely setting the image capturing conditions of the image capture apparatus selected in the list view 607. FIG. 9 illustrates an example of a remote control GUI screen 910 for the image capture apparatus. The remote control GUI screen 910 includes operation buttons corresponding to the type of the image capture apparatus, and current settings values are displayed for the operation buttons. An aperture value button 912, a capture sensitivity button 913, and a shutter speed button 914 include pull-down lists, and values that can be set are displayed as a list upon the buttons being selected. When a value is selected from the list, the CPU 201 sends the exposure conditions corresponding to the type of the button to the image capture apparatus through the communication unit 208 as a command for changing the selected value. When a capture instruction button 911 is operated, the CPU 201 sends a command instructing an image to be captured to the image capture apparatus through the communication unit 208.

When an operation of an "image capturing conditions auto setting" button 609 is detected, the CPU 201 executes a process for automatically setting the image capturing conditions (aperture value, exposure conditions, and white balance) of the image capture apparatus selected in the list view 607 to values suited to automatic alignment. This process will be described in detail later along with a test image capturing operation.

When an operation of a "test image capture" button 610 is detected, the CPU 201 executes a test capturing process, which is carried out by the image capture apparatus selected in the list view 607. In the present embodiment, a first test image capture for the purpose of confirming the angle of view of the image capture apparatus, and a second test image capture for the purpose of confirming or automatically setting the image capturing conditions for each of the projectors, are executed as different processes.

Figure 10A:
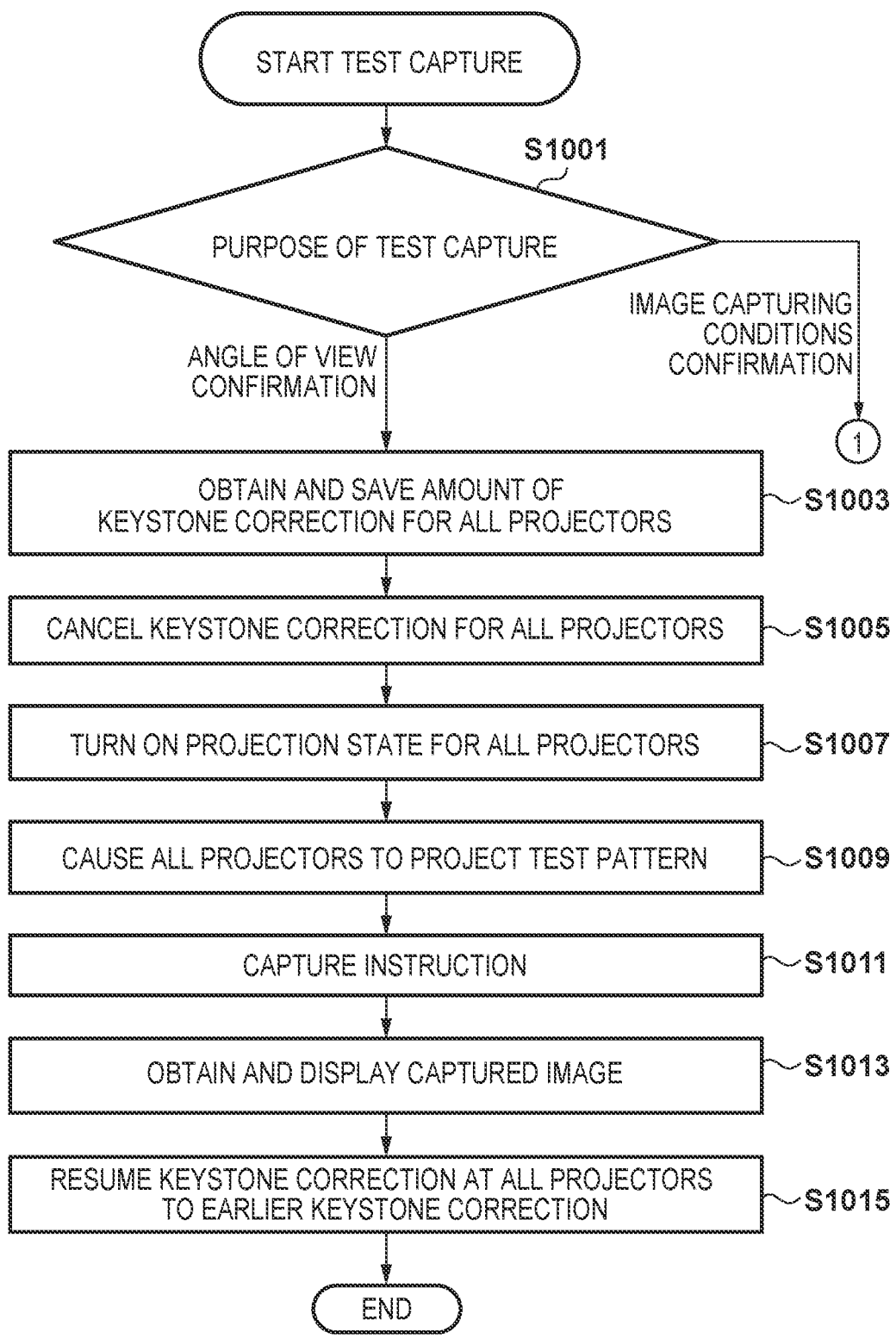
FIGS. 10A and 10B are flowcharts illustrating a test capturing process according to the embodiment.
Figure 10B:
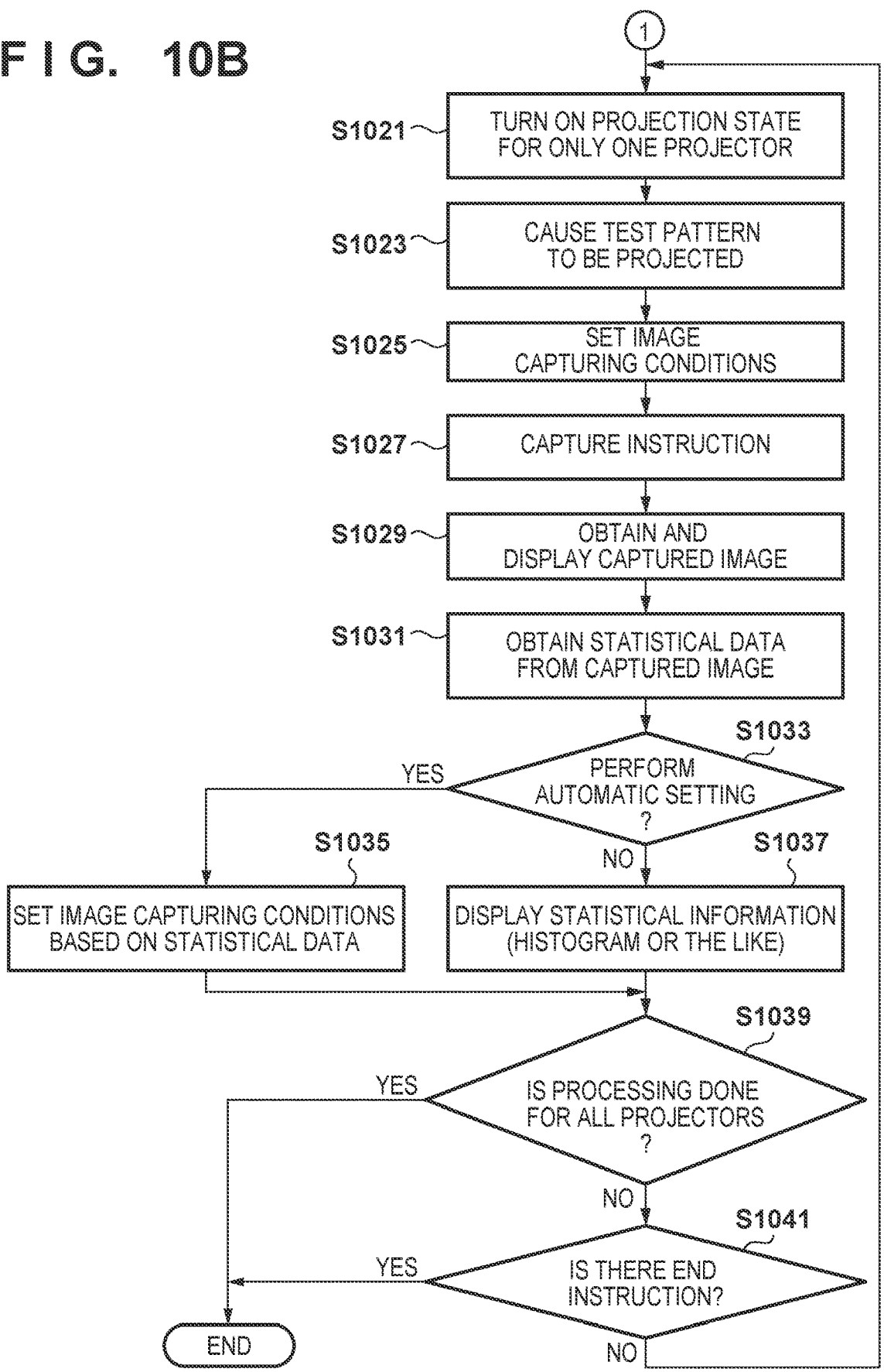

The test capturing process will be described using the flowcharts in FIGS. 10A and 10B. The CPU 201 starts the test capturing process upon detecting an operation of the "test image capture" button 610 in the GUI screen 600 of the projection control application.

In S1001, the CPU 201 determines, on the basis of the selection state of radio buttons 627 and 628, whether the process is a test image capture for the purpose of confirming the angle of view (the first test image capture) or a test image capture for the purpose of confirming the image capturing conditions (the second test image capture). Specifically, if the radio button 627 is selected, the CPU 201 determines that the purpose of the test image capture is confirming the angle of view, and moves the process to S1003. If the radio button 628 is selected, the CPU 201 determines that the purpose of the test image capture is confirming the image capturing conditions, and moves the process to S1021. Note that the automatic image capturing conditions setting process executed when an operation of the "image capturing conditions auto setting" button 609 is detected corresponds to the processing from S1021.

First, the test image capturing operation for the purpose of confirming the angle of view will be described.

In S1003, the CPU 201 obtains the amount of keystone correction currently applied, from each of the projectors to be adjusted (the projectors displayed in the list view 603). Note that if the keystone correction amount has already been obtained when displaying the information of the connected projectors in the list view 601, the amount of keystone correction can be obtained from the information of the projectors managed by the RAM 202. In this case, it is not necessary to send a command requesting the keystone correction amount to the projector again in S1003.

In S1005, the CPU 201 sends a command instructing the keystone correction to be canceled to each of the projectors to be adjusted through the network IF 206. Upon receiving the command, the CPU 101 of the projector instructs the image processing unit 109 to cancel the keystone correction. Thereafter, the image processing unit 109 does not apply keystone correction to the data of the image for projection.

In S1007, the CPU 201 sends a command instructing the projection to be turned on to each of the projectors to be adjusted through the network IF 206. This command may be, for example, a command to light the light source, a command instructing the projection of a blank (black) screen to be canceled, or the like.

In S1009, the CPU 201 sends a command instructing the test pattern to be projected to each of the projectors to be adjusted through the network IF 206. If the test pattern is supplied from the PC 200, the CPU 201 reads out the image data of the test pattern from, for example, the ROM 203 and sends that data to the projector along with the command. When using a test pattern held by each projector, information specifying the test pattern or information indicating the purpose of the test pattern can be included in the command. The test pattern for confirming the angle of view may be any pattern through which at least the outer edges of the projected area can be confirmed in the projected image. The pattern may be an image that is completely filled, or a frame-shaped image indicating the outer edges with a solid line. Alternatively, as described with reference to FIGS. 8A and 8B, for example, a test pattern having a rectangular region expressing the upper limit value of the keystone correction amount for each projector may be used. This enables the user to understand not only whether or not the projected areas for all of the projectors to be adjusted are within the angle of view (the image capturing range), but also whether or not positioning can be accomplished through correction.

The CPU 101 of the projector that has received the command stores the test pattern image that has been supplied or read out from the ROM 203 to the VRAM 106, and instructs the image processing unit 109 to start projection. As a result, the image processing unit 109 starts the supply of the test pattern image data to the projection control unit 105. The projection control unit 105 controls the transmittance or reflectance of the optical modulation element in the projection unit 104 on the basis of the test pattern image data to cause an optical image of the test pattern to be projected.

In S1011, the CPU 201 instructs the image capture apparatus 400 to capture an image, through the communication unit 208. As a result, the image capture apparatus 400 captures an image and sends the obtained image data to the PC 200.

In S1013, the CPU 201 stores the image data obtained from the image capture apparatus 400 in the RAM 202, for example. The CPU 201 then displays the captured image in a region 611 of the GUI screen 600 illustrated in FIG. 6A. On the basis of the image displayed in the region 611, the user can confirm whether the entire projected area of the projector to be adjusted fits within the angle of view of the image capture apparatus 400. Note that the determination as to whether or not the entire projected area of the projector to be adjusted fits within the angle of view of the image capture apparatus 400 may be executed automatically by the CPU 201 analyzing the captured image data. If it has been determined that there is a projector for which the projected area does not fit within the angle of view of the image capture apparatus 400, the CPU 201 may display the warning screen or the like to prompt the user to modify the arrangement of the projectors or the image capture apparatus.

Once the image is displayed in the region 611 in S1013, the CPU 201 moves the process to S1015. In S1015, the CPU 201 sends a command instructing keystone correction to be applied in each of the projectors to be adjusted through the network IF 206. At this time, the CPU 201 sends a command specifying the keystone correction amount obtained earlier to each of the projectors to which the command is to be sent. This resumes each projector to the projection state from before the keystone correction was canceled in S1004. Note that this assumes a case where the projectors do not have functions for retaining the keystone correction amounts. However, if the projectors have functions for retaining the keystone correction amounts, it is sufficient to send a command that simply activates the keystone correction in S1015.

The test capturing process for the purpose of confirming the angle of view is thus ended. Note that if there is a projector for which the projected area does not fit in the angle of view of the image capture apparatus 400, the user adjusts at least one of the angle of view of the image capture apparatus 400 and the position of the projector, and then executes the test image capture for the purpose of confirming the angle of view again. The adjustment and test image capture are repeated until the projected areas for all of the projectors to be adjusted are successfully confirmed as fitting within the angle of view of the image capture apparatus 400.

Note that to carry out the automatic alignment accurately, it is desirable that the projected areas of the projectors to be adjusted fit within the angle of view of the image capture apparatus 400 at a sufficiently large size. As such, the user adjusts the angle of view of the image capture apparatus 400 and the position of the projectors so that, for example, the size of the projected area occupying the image captured of the projection plane is no less than approximately 25%. Note that 25% is merely an example, and the percentage can be determined as appropriate in light of the precision of automatic alignment.

The test image capturing operation for the purpose of confirming the image capturing conditions (or for automatically setting the image capturing conditions), carried out from S1021 on, will be described next.

First, in S1021, the CPU 201 sends, through the network IF 206, a command instructing the projection to be turned on, to one projector, among the projectors to be adjusted, for which the image capturing conditions have not yet been confirmed. This command may be the same as the command sent in S1007. In the test image capture for the purpose of confirming the image capturing conditions, the image capturing conditions are confirmed for each projector, and it is therefore necessary to capture an image of a state in which only one of the projectors is projecting. Accordingly, unlike the test image capture for the purpose of confirming the angle of view, the projection is turned on for only one projector, of the projectors to be adjusted, for which the image capturing conditions are to be confirmed.

Although these descriptions discuss a case where the image capturing conditions are confirmed one at a time for all the projectors to be adjusted, it is also possible to confirm the image capturing conditions for only one projector selected by the user from among the projectors to be adjusted. In this case, a GUI for selecting one of the projectors to be adjusted (e.g., a GUI for selecting one of the projectors displayed in the list view 603) may be provided, and the processing from S1021 and on may be executed only for the one selected projector.

In S1023, the CPU 201 sends a command instructing the test pattern to be projected to the projector whose projection was turned on in S1021, through the network IF 206. This command may be the same as the command sent in S1009. However, it is assumed that the test pattern is the same as the pattern projected during automatic alignment. For example, a different test pattern may be used for each projector, or the same image, such as a completely white image, may be used as the test pattern.

In S1025, the CPU 201 sends a command through the communication unit 208 to set the image capturing conditions in the image capture apparatus 400. For example, if the image capturing conditions have already been determined for each of the projectors to be adjusted by operating the "image capturing conditions auto setting" button 609, the CPU 201 can read out the corresponding image capturing conditions from the RAM 202 and set the conditions. Alternatively, the CPU 201 may set the image capture apparatus 400 to a shutter speed priority AE mode, and may further set the shutter speed to a value based on the framerate of the projector. In this case, the shutter speed can be set to a shutter speed equivalent to the inverse of the framerate (frames/sec), i.e., to 1/framerate (sec), for example.

In S1027, the CPU 201 instructs the image capture apparatus 400 to capture an image, through the communication unit 208. As a result, the image capture apparatus 400 captures an image and sends the obtained image data to the PC 200.

In S1029, the CPU 201 stores the image data obtained from the image capture apparatus 400 in the RAM 202, for example. The CPU 201 then displays the captured image in the region 611 of the GUI screen 600 illustrated in FIG. 6A, and moves the process to S1031. Note that if the CPU 201 detects that a mouse pointer or cursor is positioned on the image displayed in the region 611, the CPU 201 may display a luminance value or the like of the corresponding pixel.

In S1031, the CPU 201 extracts an image region corresponding to the projected area from the image data. Then, the CPU 201 generates information for determining the image capturing conditions (statistical data) from the image data in the extracted region, and stores that information in the RAM 202. The statistical data may be data typically used in automatic exposure control or auto white balance adjustment, such as a luminance histogram, an average luminance, a white pixel value, or the like. The CPU 201 may also determine whether or not the projected area fits within the angle of view (the image capturing range), and may issue a warning if it is determined that the area does not fit.

In S1033, the CPU 201 determines whether or not to automatically set the image capturing conditions. For example, if the processing from S1021 has been executed in response to the detection of an operation of the "image capturing conditions auto setting" button 609 in FIG. 6A, the CPU 201 determines to automatically set the image capturing conditions. On the other hand, if the test image capture for the purpose of confirming the image capturing conditions is being executed, the CPU 201 determines not to automatically set the image capturing conditions. Alternatively, the CPU 201 may inquire with the user as to whether or not to automatically set the image capturing conditions for the projector whose projection state is currently on (that is, is projecting), and may branch the processing in accordance with the response from the user. For example, the inquiry can be made to the user by displaying, in the display unit 205, an inquiry screen that allows the user to select whether or not automatically set the conditions. If a test image capture for the purpose of automatically setting the image capturing conditions is being executed, in S1033, the CPU 201 may inquire with the user as to whether or not to apply the most recently-determined image capturing conditions to all of the projectors and then end the test image capture process. This is because when the same image capturing conditions can be applied to all the projectors, there are cases where the level of accuracy achieved by determining the image capturing conditions individually for each projector is not required.

If it is determined (or instructed by the user) that the settings are to be made automatically, the CPU 201 moves the process to S1035, whereas if it is determined (or instructed by the user) that the settings are not to be made automatically, the CPU 201 moves the process to S1037.

In S1035, the CPU 201 uses the statistical data generated in S1031 to determine the image capturing conditions (exposure conditions and white balance) through a known method. The CPU 201 then sets the determined image capturing conditions in the image capture apparatus 400 through the communication unit 208. The CPU 201 also stores the determined image capturing conditions in the RAM 202 as the image capturing conditions for the projector whose projection state is currently set to on (is currently projecting). If there are image capturing conditions determined in the past at this time, the CPU 201 updates those conditions. The CPU 201 then moves the process to S1039.

On the other hand, in S1037, the CPU 201 displays the statistical data generated in S1031 in the GUI screen 600 or in another screen, and moves the process to S1039. Note that the process may be moved to S1039 in response to the detection of a confirmation input indicating that the process for the projector that is currently projecting may be ended. For example, the user can manually set the image capturing conditions for the projector currently projecting on the basis of the statistical data displayed in S1037. The manual settings may be made by directly operating the image capture apparatus 400 as described above, or may be made remotely through a GUI screen displayed in the display unit 205.

In S1039, the CPU 201 determines whether or not the confirmation of the image capturing conditions (or the determination and setting of the image capturing conditions) is complete for all of the projectors to be adjusted; if it is determined to be complete, the CPU 201 ends the process, and if it is determined to be incomplete, the CPU 201 moves the process to S1041.

In S1041, the CPU 201 determines whether or not an instruction to end the process has been detected; if it is determined to be detected, the CPU 201 ends the process, whereas if it is determined to be not detected, the CPU 201 returns the process to S1021 and carries out the process for one of the remaining projectors. Here, the instruction to end the process may be an instruction to suspend or forcibly terminate the process, made through the operation unit 204. If there are many projectors to be adjusted, the process for confirming (or determining and setting) the image capturing conditions for all the projectors will take a long time. It is for this reason that the process may be suspended.

The test capturing process described above is executed as part of the process for setting the image capturing conditions indicated by S400. The number of projectors that are to be caused to project at the same time, the timing of the projection, and so on differ depending on whether the purpose of the test image capture is to confirm the angle of view or confirm the image capturing conditions. In the present embodiment, a test image capture suited to the purpose is executed simply by specifying the purpose of the test image capture and instructing the test image capture to be executed, which makes it possible to carry out the appropriate test image capture while at the same time reducing the workload.

Returning to FIG. 6B, the lower half of the GUI screen 600 of the projection control application will be described. The details of the automatic alignment differ between stacked projection (FIG. 1) and multi-screen projection (FIG. 2). Accordingly, the GUI screen 600 is configured to selectively display setting regions depending on the type of the multi-projection. Specifically, the CPU 201 displays a stacked projection setting region when an operation for selecting a tab 613 is detected, and displays a multi-screen projection setting region when an operation for selecting a tab 614 is detected. FIG. 6A illustrates a state where the stacked projection setting region is displayed, whereas FIG. 6B illustrates a state where the multi-screen projection setting region is displayed.

Stacked Projection Setting Region

The stacked projection described with reference to FIG. 1 is multi-projection in which the projection is carried out so that a plurality of projected areas correspond. A plurality of projection optical systems cannot be arranged to have the same optical axes, and thus the maximum number of projectors that will not require keystone correction is 1. It is often the case that projectors cannot easily be arranged in positions that face the projection plane straight, and thus in reality, all the projectors are often subject of keystone correction. Positioning in stacked projection is a process for automatically determining the keystone correction amount for each projector so that the projected areas correspond.

In the stacked projection setting region illustrated in FIG. 6A, 615, 616, and 617 are radio buttons for exclusively selecting an automatic alignment mode. In the present embodiment, one stacked projection automatic alignment mode can be selected from among "four-point specification adjustment", "automatic shape determination", and "alignment with reference projector".

"Four-point specification adjustment" is a mode that automatically determines the amount of keystone correction so that the vertices of the projected area are aligned with four predetermined points. For example, the CPU 201 displays movable adjustment markers 622, 623, 624, and 625, which correspond to the upper-left, upper-right, lower-right, and lower-left vertices, respectively, of the projected area, in a four-point adjustment region 621. The user can specify the coordinates of each vertex of the projected area by moving the individual adjustment markers through, for example, a drag-and-drop operation or a combination of a selection operation and a cursor operation. Four-point specification adjustment is useful in cases where the projection target position is clear, such as when the projection plane is a screen with a frame. Note that the number of points through which the coordinates can be adjusted may be fewer than four, or five or more points including coordinates of areas aside from the vertices may be used.

"Automatic shape determination" is a mode that executes a process (a third adjustment process) for automatically determining the amount of keystone correction so that the individual projected images are quadrangles. In this mode, four points serving as targets for positioning are determined by the CPU 201 on the basis of captured images of the projected areas. The CPU 201 then determines a keystone correction amount that aligns the vertices of the individual projected areas with the determined four points. Operations for specifying the four points thus need not be carried out by the user. Automatic shape determination is useful in cases where the target position for the projection is unclear (e.g., projection onto a broad wall surface).

"Four-point specification adjustment" and "automatic shape determination" are modes that execute a process (a second adjustment process) for automatically determining the amount of keystone correction for causing the projected areas of all of the projectors to correspond with a projected area determined by the user or the CPU 201 in advance. On the other hand, "alignment with reference projector" is a mode that executes a process (a first adjustment process) for automatically determining the amount of keystone correction so that one projector serves as a reference projector, and the projected areas of the other projectors are caused to correspond with the projected area of the reference projector. The automatic alignment according to this mode is executed when the position of the projected area of the reference projector has been adjusted to a specified position. The amount of keystone correction for causing the projected areas of the projectors aside from the reference projector to correspond to the projected area of the reference projector is determined automatically.

When an operation for selecting the radio button 617 for "alignment with reference projector" is detected, the CPU 201 copies the information of the projectors displayed in the list view 603 to a list view 618. The reference projector may be selected automatically, or may be made selectable by the user. For example, a configuration in which the projector listed at the top of the list view 618 serves as the reference projector and the user can change the order in the list through drag-and-drop operations is possible, but another desired configuration can be adopted instead. Additionally, the CPU 201 can refer to a list managed by the RAM 202 and automatically set the projector having the lowest amount of keystone correction as the reference projector. Furthermore, as described above, a projector for which the keystone correction is not canceled in response to a warning made when selected in the list view 603 may be set as the reference projector.

To assist the user in selecting the reference projector, the projectors displayed in the list view 618 may, for example, be caused to project their projected areas. For example, upon detecting an operation of a "display test pattern" button 619, the CPU 201 causes the reference projector, among the projectors displayed in the list view 618, to project a pattern image such as that illustrated in FIG. 11A, for example. The CPU 201 causes the remaining projectors displayed in the list view 618 to project a pattern image such as that illustrated in FIG. 11B, for example. Basically, any pattern image can be used as long as the pattern image enables the outer edges of the projected areas of all of the projectors to be understood, and makes it possible to identify the projected area of one selected projector.

Figure 11C:
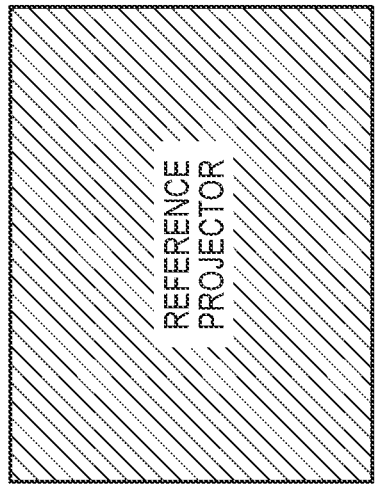
Figure 11C:
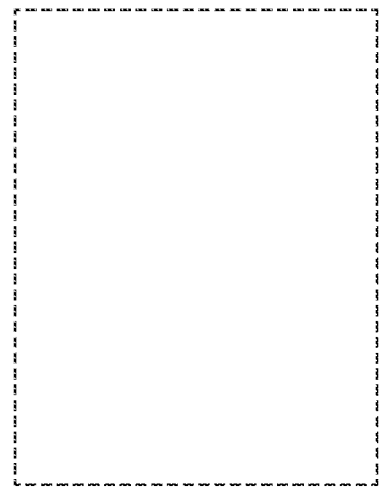
Figure 11C:
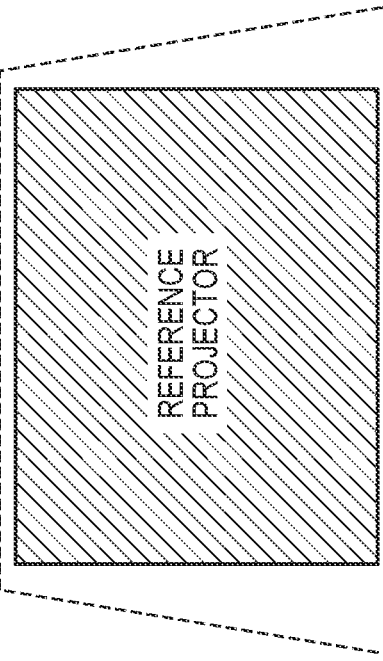

FIG. 11C is a diagram schematically illustrating the projected image when two projectors are displayed in the list view 618 and the information of one of the projectors is selected. On the basis of the projected image, the user can easily determine the projected area of the projector currently selected. Additionally, the relationship between the projected area of the projector currently selected and the projected areas of the other projectors can be understood with ease. Note that the pattern image may be sent from the PC 200 to the projector 100 through the network IF 206 as image data, or may be sent through the video output unit 207 as a video signal.

When an operation of an "auto adjustment start" button 620 is detected, the CPU 201 starts the automatic alignment process corresponding to the selected radio button. The automatic alignment process will be described in greater detail later.

Multi-Screen Projection Setting Region

The multi-screen projection described with reference to FIG. 2 is multi-projection in which a plurality of projected areas are arranged next to each other. Positioning in multi-screen projection is a process for automatically determining the keystone correction amount for each projector so that there is no misalignment between overlapping parts of adjacent projected areas.

The following will describe items unique to multi-screen projection, and items that are the same as with stacked projection will be skipped. First, in multi-screen projection, the automatic alignment modes do not include "alignment with reference projector". When the CPU 201 detects an operation for selecting the tab 614 and displays the multi-screen projection setting region, the information of the projectors displayed in the list view 603 is copied to and displayed in a list view 631.

A list view 629 provides options for patterns in which the projected areas are to be arranged for the multi-screen projection. The user can select one of these options. "2×2" indicates a two-row, two-column arrangement; "1×4", a one-row, four-column arrangement; and "4×1", a four-row, one-column arrangement. The options for the selectable arrangement patterns change depending on the number of projectors displayed in the list view 631.

A region 630 is a display schematically illustrating the arrangement pattern selected by the user in the list view 629. When an arrangement pattern is selected in the list view 629, the CPU 201 displays an image based on the selected arrangement pattern in the region 630. Visualizing the arrangement pattern makes it possible to prevent, for example, a 1×4 arrangement from being mistaken for a 4×1 arrangement.

The list view 631 is a region that displays the correspondence relationships between the projected areas constituting the arrangement pattern and the projectors so that the relationships can be changed. The user can understand the correspondence relationships from IDs of the projected areas included in the image of the arrangement pattern displayed in the region 630 (1 to 4, in FIG. 6B) and from the content of a text box 632 displayed in association with the information of the individual projectors in the list view 631. The content of the text box 632 can be changed by the user, and for example, when the upper-left region is to be projected using "projector A 192.168.254.1", "1" is entered into the corresponding text box 632. The projected area IDs may be any text, symbols, marks, or the like aside from numbers, as long as the same IDs are not given to different projected areas. The CPU 201 stores and manages the arrangement patterns and information indicating which projected area of the arrangement patterns each projector handles, in the RAM 202.

Text boxes 633 and 634 are regions in which edge blending widths in the vertical direction and horizontal direction are entered as pixel numbers. The CPU 201 stores the values entered in the text boxes 633 and 634 in the RAM 202 as edge blending width information. Note that the text boxes 633 and 634 can also be displayed with default values entered therein.

An edge blending process will be described using FIGS. 12A to 12D. Although an edge blending process in the horizontal direction will be described here, the same principles apply for the vertical direction as well.

FIGS. 12A and 12B illustrate projected images 1100a and 1100b for first and second projectors. The projected image 1100a is constituted by a non-overlapping region 1110a and an overlapping region 1120a. Likewise, the projected image 1100b is constituted by a non-overlapping region 1110b and an overlapping region 1120b. The sizes of the overlapping regions 1120a and 1120b in the horizontal direction correspond to a horizontal edge blending width specified in the text box 634.

FIG. 12C illustrates a relationship between the magnitude of gain controlled by the edge blending process, and a horizontal direction position in the image. Gain 1130a and 1130b are gain applied to the image processing units 109 of the first projector and the second projector, respectively. No increase in luminance due to image synthesis arises in the non-overlapping regions 1110a and 1110b, and thus the gain is set to 1.0× and no change is made to the image luminance. However, if the gain is set to 1.0 in both the overlapping regions 1120a and 1120b, the luminance will increase and the overlapping regions of the projected image will stand out. Accordingly, for the overlapping regions 1120a and 1120b, the gain is reduced to 0 in a linear manner moving toward the end parts of the image. At this time, the adjustment is made so that the relationship 1130a=1.0−1130b is satisfied. The gain in the overlapping regions may be changed in a non-linear manner as well.

FIG. 12D illustrates a projected image. Both the overlapping regions 1120a and 1120b are projected in an overlapping region 1140 of the projected image. When a uniform image is projected, for example, the luminance of the overlapping region 1140 is similar to the luminance of the non-overlapping regions 1110a and 1110b, and thus the boundary between the two projected images does not stand out. With an image projected so that the adjacent projected areas are both on the left and right or on the top and bottom, the edge blending process is applied to the overlapping regions present on both the left and right (or the top and bottom).

As described above, processing carried out in response to operations made in the stacked projection setting region and the multi-screen projection setting region is executed as part of the process indicated by S500.

Automatic Alignment Process

Figure 13:
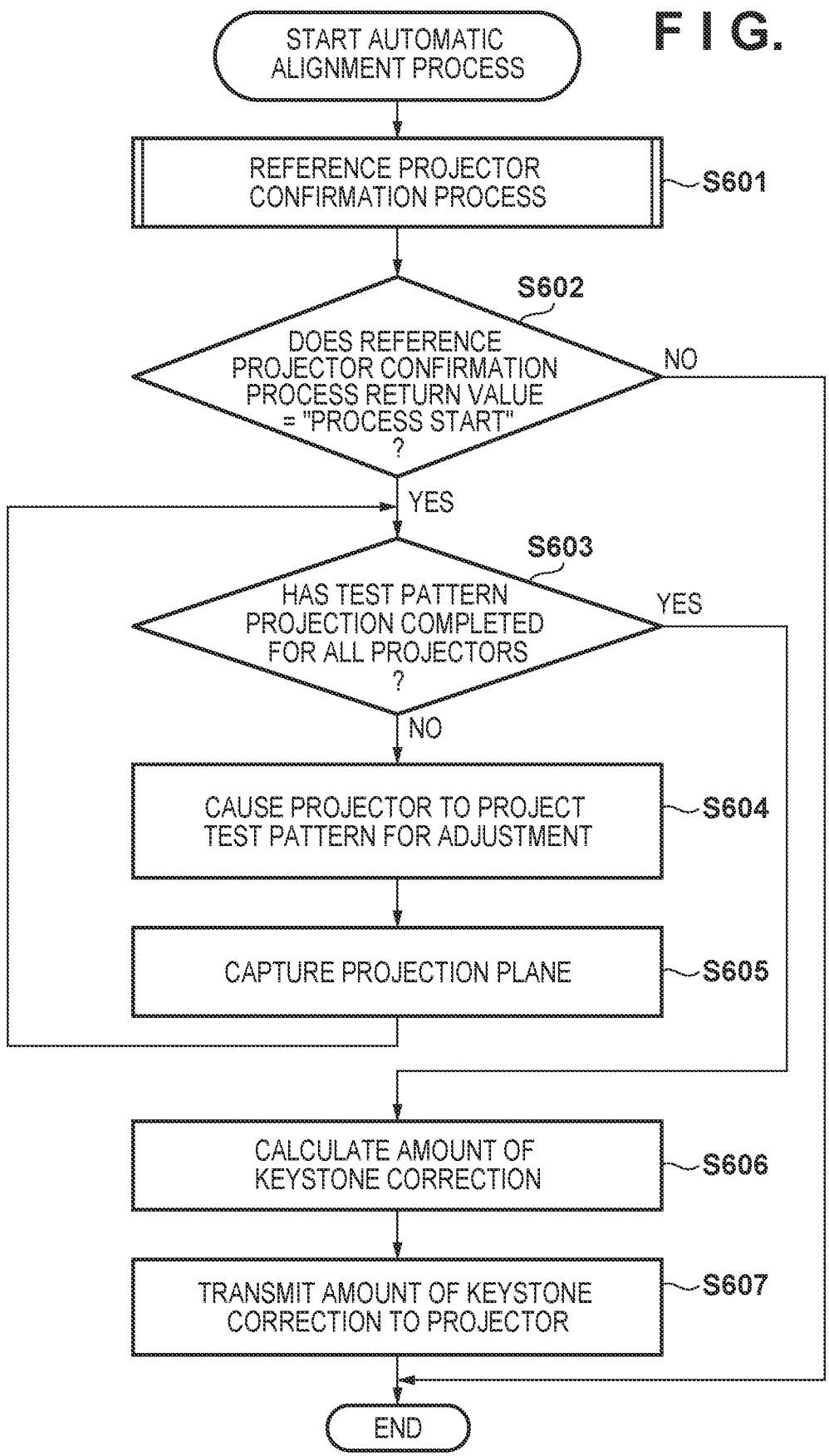
FIG. 13 is a flowchart illustrating the automatic alignment process according to the embodiment.
Figure 14:
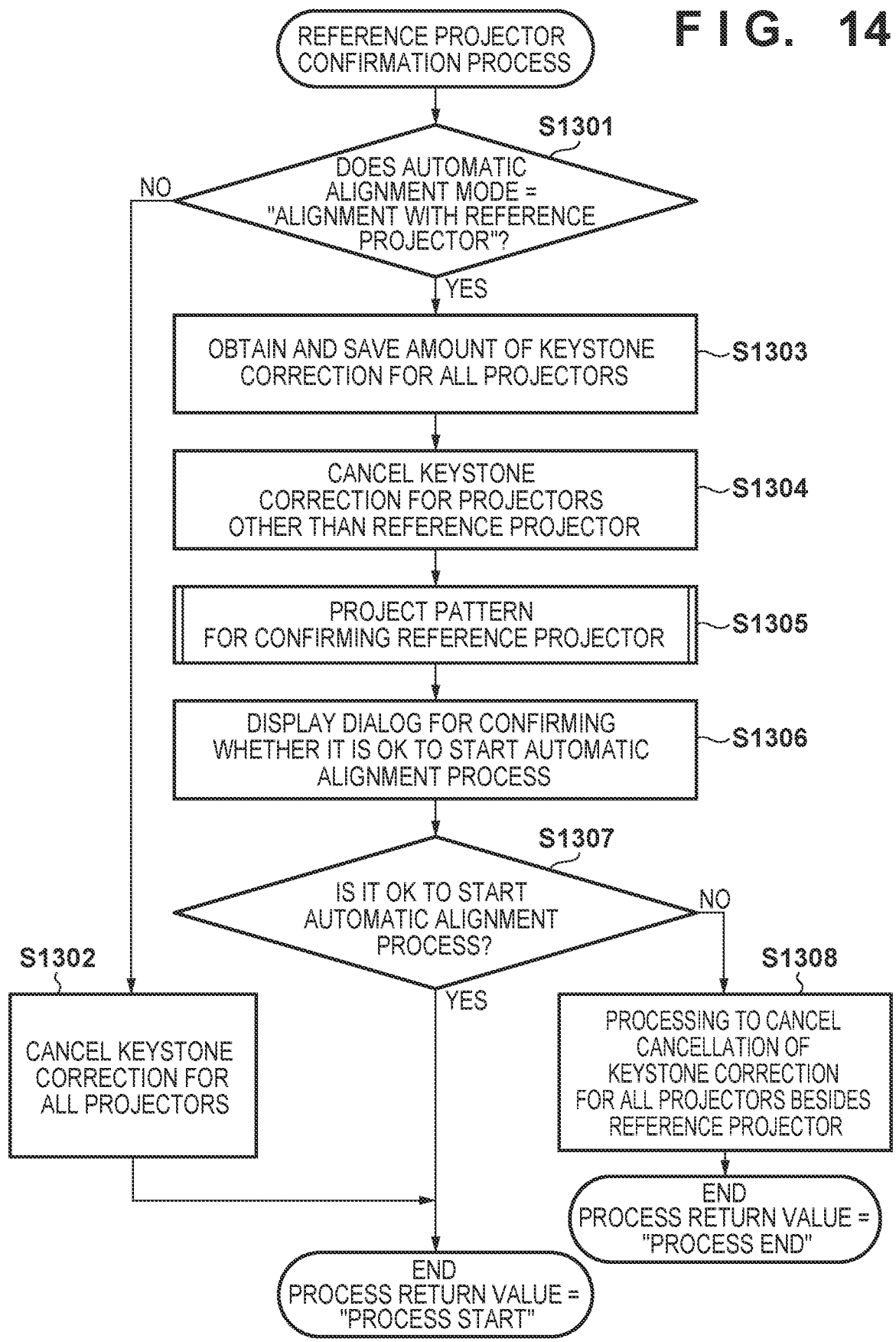
FIG. 14 is a flowchart illustrating a reference projector confirmation process according to the embodiment.

The automatic alignment process of FIG. 5 (S600) will be described in detail next using FIGS. 13 to 15. The automatic alignment process is started upon the CPU 201 detecting an operation of the "auto adjustment start" button 620.

In S601, the CPU 201 carries out a process for confirming the reference projector. The process for confirming the reference projector is a process of requesting the user to make a confirmation regarding the execution of the substantive positioning processing (adjustment process) of S603 and on for the current reference projector in a situation where the "alignment with reference projector" automatic alignment process is set to be carried out. In the confirmation process, geometric correction currently applied in the projectors aside from the reference projector is canceled in a situation where the "alignment with reference projector" automatic alignment process is set to be carried out. Geometric correction currently applied in each projector is canceled in a situation where an automatic alignment process aside from "alignment with reference projector" is set to be carried out.

In S602, the CPU 201 determines whether or not to execute the adjustment process from S603 on in accordance with the result of the process for confirming the reference projector.

Here, the process for confirming the reference projector carried out in S601 will be described using the flowchart in FIG. 14.

In S1301, the CPU 201 determines whether or not the automatic alignment mode setting stored in the RAM 202 is "alignment with reference projector". If the setting is "alignment with reference projector", the CPU 201 moves the process to S1303; and if not, the CPU 201 moves the process to S1302.

In S1302, the CPU 201 sends a command instructing the keystone correction to be canceled to all the projectors to be adjusted (the projectors displayed in the list view 603 in FIG. 6A), through the network IF 206. The CPU 201 then ends the process for confirming the reference projector. In this case, the return value of the process is "process start". Upon receiving the command, the CPU 101 of the projector instructs the image processing unit 109 to cancel the keystone correction.

In S1303, the CPU 201 sends a command to each of the projectors to be adjusted (the projectors displayed in the list view 618) through the network IF 206, and obtains the amount of keystone correction currently applied. Note that if the keystone correction amount has already been obtained when displaying the information of the projectors connected to the list view 601 or during the test image capture, the amount of keystone correction can be obtained from the information of the projectors managed by the RAM 202. In this case, it is not necessary to send a command requesting the keystone correction amount to the projector again in S1303.

In S1304, the CPU 201 sends a command instructing the keystone correction to be canceled to each of the projectors to be adjusted aside from the reference projector, through the network IF 206. As a result, the keystone correction is canceled for the projectors aside from the reference projector. Note that the reference projector is selected by the user or automatically, as described above.

In S1305, the CPU 201 causes the reference projector to project the pattern image illustrated in FIG. 11A, and causes each of the other projectors to project the pattern image illustrated in FIG. 11B. As a result, the user can confirm the projected areas of the reference projector that is currently set, as well as the other projectors. It is also possible to cause only the reference projector to project the pattern image.

In S1306, the CPU 201 requests that the user approve the execution of the "alignment with reference projector" automatic alignment process that is currently set. The CPU 201 can request this approval by displaying a dialog message such as a dialog message 1400 illustrated in FIG. 15 in the display unit 205. The CPU 201 stands by until an operation of a "yes" button 1401 or a "no" button 1402 included in the dialog message is detected.

In S1307, the CPU 201 determines whether or not the user has made an instruction indicating that the execution of the automatic alignment process may be started. Upon detecting an operation of the "yes" button 1401, the CPU 201 determines that the user has made an instruction indicating that the execution of the automatic alignment process may be started, and ends the process for confirming the reference projector. In this case, the return value of the process is "process start".

On the other hand, upon detecting an operation of the "no" button 1402, the CPU 201 determines that the user has made an instruction indicating that the automatic alignment process cannot be executed, and moves the process to S1308. In S1308, the CPU 201 sends a command instructing keystone correction to be applied in each of the projectors to be adjusted, aside from the reference projector, through the network IF 206. At this time, the CPU 201 sends a command specifying the keystone correction amount obtained earlier to each of the projectors to which the command is to be sent. This returns each projector to the projection state from before the keystone correction was canceled in S1304. Note that this assumes a case where the projectors do not have functions for retaining the keystone correction amounts. However, if the projectors have functions for retaining the keystone correction amounts, it is sufficient to send a command that simply activates the keystone correction in S1308. Once the process of S1308 ends, the CPU 201 ends the process for confirming the reference projector. In this case, the return value of the process is "process end".

Figure 15:
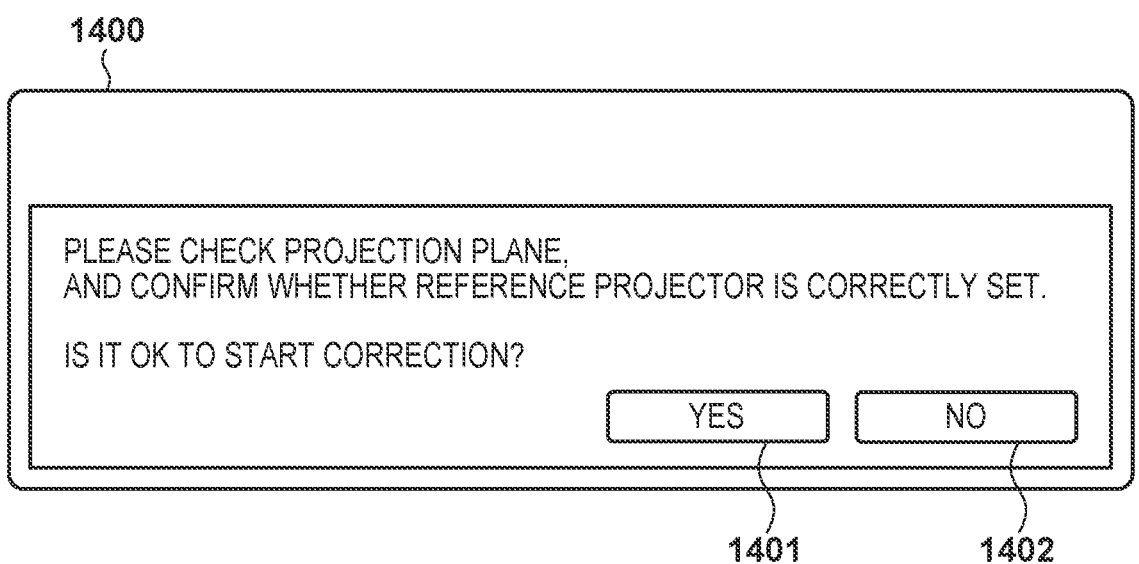
FIG. 15 is a diagram illustrating an example of a dialog that can be displayed in the reference projector confirmation process according to the embodiment.

Note that the inquiry with the user as to whether or not the automatic alignment process may be executed is not limited to using the dialog message illustrated in FIG. 15. Additionally, the projection of the pattern image started with S1305 may be ended after the end of S1307.

Through the process of confirming the reference projector, the keystone correction applied in the projectors aside from the reference projector is canceled before executing the automatic alignment process for aligning the projected areas (or projected images) of the other projectors with the projected area (or projected image) of the reference projector. This makes it possible to avoid positioning at the wrong projection position, eliminate the burden of reapplying keystone correction to the reference projector, and so on caused by the keystone correction having been canceled for the reference projector in order to determine the precise projection position. On the other hand, when carrying out an automatic alignment process in which the reference projector is not set, such as four-point specification adjustment or automatic shape determination, the keystone correction is canceled for all the projectors subject of positioning, before executing the automatic alignment process. This makes it possible to keep the amount of keystone correction or the number of applications thereof to the original image to a minimum, which makes it possible to suppress a drop in the quality of the corrected image for projection, and by extension, of the projected image.

Furthermore, a test pattern expressing the projected area of the reference projector is projected before executing the automatic alignment process so that the user can confirm the reference projector setting. This makes it possible to prevent the positioning processing from being executed using a projector not intended by the user as the reference projector, such as in a situation where the reference projector is automatically set. This also makes it possible to confirm that the intended projector is set as the reference projector before starting the automatic alignment process.

Returning to FIG. 13, in S602, the CPU 201 determines whether the result of the process for confirming the reference projector (the return value) is "process start" or "process end"; if it is determined to be "process start", the CPU 201 moves the process to S603, and if it is determined to be "process end", the CPU 201 ends the positioning processing. In this manner, the "alignment with reference projector" positioning processing is not executed if the user has not approved the current reference projector.

In S603, the CPU 201 starts the substantive automatic alignment process (adjustment process). The CPU 201 determines whether or not the projection and capturing of a test pattern for adjustment has been carried out for all of the projectors to be adjusted (including the reference projector, if a reference projector is present); if it is determined that the projection and capturing has been carried out, the CPU 201 moves the process to S606, and if it is not determined, the CPU 201 moves the process to S604.

In S604, the CPU 201 causes one of the projectors to be adjusted to project a test pattern for positioning. As described above, the projection of the test pattern may be instructed using a command sent through the network IF 206, or may be realized by supplying a video signal through the video output unit 207 and the video distribution device 300. Note that the CPU 201 causes the projectors aside from the projector projecting the test pattern to project a black image, or sends a command turning the projection off for those projectors, so that the projected area of the projector projecting the test pattern can be recognized from the image captured of the projection plane. The test pattern for positioning need not be the same for all the projectors. For example, the test pattern may be varied in consideration of the positions where the projectors are installed, the projection positions of the projector in multi-screen projection, and so on.

In S605, the CPU 201 sends a command instructing the image capture apparatus 400 used in positioning to capture an image, through the communication unit 208. Upon receiving the command, the image capture apparatus 400 captures the image and sends the obtained image data to the PC 200. If necessary, a command for sending the image data to the PC 200 may be sent to the image capture apparatus 400 separately by the CPU 201. The CPU 201 stores the received image data in the RAM 202.

In S606, the CPU 201, functioning as recognizing means, recognizes the vertices of the projected area of the projector currently projecting the test pattern, and the coordinates of the vertices, from the image data stored in the RAM 202. Then, functioning as control means, the CPU 201 determines the amount of keystone correction for the projector currently projecting the test pattern, using a method selected in accordance with the automatic alignment mode setting.

For example, if an automatic alignment process for stacked projection is to be carried out, the CPU 201 determines the keystone correction amount as follows. In "four-point specification adjustment", the CPU 201 determines the amount of keystone correction for aligning the coordinates of the vertices of the projected area with the coordinates of four points specified by the user. In "automatic shape determination", the CPU 201 determines the coordinates of four points included in a range in which keystone correction can be carried out for all of the projectors, and then determines a keystone correction amount for aligning the vertices of the projected area with those coordinates. In "alignment with reference projector", for the reference projector, the CPU 201 recognizes the four vertices of the projected area and the coordinates of the vertices, whereas the CPU does not determine the keystone correction amount. For the projectors aside from the reference projector, CPU 201 recognizes the vertices of the projected area and the coordinates of the vertices, then determines a keystone correction amount for aligning the coordinates of the four vertices of the recognized projected area with the coordinates of the four vertices of the projected area of the reference projector. Note that the keystone correction amount can be determined through a known method, and that the invention does not depend on the method for determining the keystone correction amount, and thus the determination method will not be described in detail here.

In S607, the CPU 201 sends a command instructing the keystone correction to be applied in each of the projectors 100, through the network IF 206. This command includes the keystone correction amount for each vertex, determined for the projector to which the command is sent. Note that in "alignment with reference projector", the CPU 201 does not send the command instructing the keystone correction to be applied in the reference projector.

The CPU 101 of the projector 100 that has received the command extracts the keystone correction amount from the command and instructs the image processing unit 109 to apply the keystone correction to the image for projection.

In the present embodiment, when carrying out the automatic alignment process for aligning the projected areas of the other projectors with the projected area of the reference projector, the keystone correction is canceled for the projectors aside from the reference projector before capturing the image for recognizing the projected area. This makes it possible to avoid positioning at the wrong projection position, eliminate the burden of reapplying keystone correction to the reference projector, and so on caused by the keystone correction having been canceled for the reference projector in order to determine the precise projection position.

Additionally, in the present embodiment, the projector that is projecting, the timing of the projection, and so on are controlled so as to execute a test image capture suited to the purpose of the test image capture. This enables the user to execute an appropriate test image capture simply by specifying the purpose of the test image capture and instructing that the capture be executed, which makes it possible to greatly reduce the workload.

OTHER EMBODIMENTS

In the foregoing embodiment, the image capturing is carried out, the image capturing conditions are determined, for each projector individually, assuming a case where the test pattern used for positioning is not the same for all of the projectors. However, if the same test pattern is used for all of the projectors, and a test image capture is to be carried out to automatically set the image capturing conditions, an image may be captured for only one representative projector, and the image capturing conditions determined as a result may then be applied in all of the projectors. Additionally, although the foregoing embodiment describes only keystone correction for correcting keystone distortion as the geometric correction applied in the projector, the application of geometric correction for barrel distortion, pincushion distortion, and so on can be handled in the same manner as the keystone correction.

Embodiments of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-241121 and 2017-241122, both filed on Dec. 15, 2017, which are hereby incorporated by reference herein in their entirety.

What is claimed is:

1. A projection control apparatus that controls projection using a plurality of projection devices that project optical images onto a projection plane, the apparatus comprising:
   at least one processor and/or at least one circuit to perform the operations of the following units:
   (1) an obtaining unit configured to obtain a projected area of each of the plurality of projection devices on the basis of an image obtained by capturing the projection plane; and
   (2) a control unit configured to execute a first adjustment process of adjusting the projected area of each projection device so as to cause the projected areas of other projection devices, among the plurality of projection devices, that are not a reference projection device, to correspond to the projected area of the reference projection device,
   wherein the control unit cancels geometric correction applied in the other projection devices before starting the first adjustment process and does not cancel geometric correction applied in the reference projection device before starting the first adjustment process.

2. The projection control apparatus according to claim 1, wherein the at least one processor and/or at least one circuit further perform the operation of a setting unit configured to set any one of a plurality of adjustment processes including the first adjustment process,
   wherein in the case where the first adjustment process is set by the setting unit, the control unit cancels the geometric correction applied in the other projection devices and does not cancel the geometric correction applied in the reference projection device, and
   wherein in the case where another adjustment process is set, the control unit cancels geometric correction being applied, for all of the plurality of projection devices before executing the another adjustment process.

3. The projection control apparatus according to claim 2, wherein the plurality of adjustment processes include a second adjustment process that causes vertices of each projected area to correspond to a plurality of points designated by a user, and
   wherein the control unit cancels geometric correction being applied, for all of the plurality of projection devices before executing the second adjustment process, in the case where the second adjustment process is set.

4. The projection control apparatus according to claim 3, wherein the plurality of adjustment processes include a third adjustment process of determining a target area present in a common area among the projected areas of projection devices when no geometric correction is applied in the projection devices, and causing the projected area of each projection device to correspond to the target area, and
wherein the control unit cancels geometric correction being applied, for all of the plurality of projection devices before executing the third adjustment process, in the case where the third adjustment process is set.

5. The projection control apparatus according to claim 1, wherein the at least one processor and/or at least one circuit further perform the operations of:
a selecting unit configured to select the plurality of projection devices from among connected projection devices; and
an inquiry unit configured to, in the case where geometric correction is applied in a projection device selected by the selecting unit, inquire with a user as to whether or not to cancel the geometric correction.

6. The projection control apparatus according to claim 5, wherein the selecting unit further selects any one of the plurality of projection devices as the reference projection device in response to a user input.

7. The projection control apparatus according to claim 1, wherein the control unit controls the geometric correction of the projected area of each projection device by sending geometric correction parameters of each projection device to each projection device.

8. The projection control apparatus according to claim 1, wherein the geometric correction is a correction process for correcting at least one of keystone distortion, barrel distortion, and pincushion distortion in the optical images.

9. A control method of a projection control apparatus that controls projection using a plurality of projection devices that project optical images onto a projection plane, the method comprising:
obtaining a projected area of each of the plurality of projection devices on the basis of an image obtained by capturing the projection plane; and
executing a first adjustment process of adjusting the projected area of each projection device so as to cause the projected areas of other projection devices, among the plurality of projection devices, that are not a reference projection device, to correspond to the projected area of the reference projection device,
wherein executing the first adjustment process includes:
(1) canceling geometric correction applied in the other projection devices before starting the first adjustment process; and
(2) executing the first adjustment process without canceling geometric correction applied in the reference projection device before starting the first adjustment process.

10. The control method of a projection control apparatus according to claim 9, further comprising:
setting any one of a plurality of adjustment processes including the first adjustment process.

11. The control method of a projection control apparatus according to claim 10, wherein the plurality of adjustment processes include a second adjustment process that causes vertices of each projected area to correspond to a plurality of points designated by a user, and
wherein the control method includes canceling geometric correction being applied, for all of the plurality of projection devices before executing the second adjustment process, in the case where the second adjustment process is set.

12. The control method of a projection control apparatus according to claim 11, wherein the plurality of adjustment processes include a third adjustment process of determining a target area present in a common area among the projected areas of projection devices when no geometric correction is applied in the projection devices, and causing the projected area of each projection device to correspond to the target area, and
wherein the control method includes canceling geometric correction being applied in all of the plurality of projection devices before executing the third adjustment process, in the case where the third adjustment process is set.

13. The control method of a projection control apparatus according to claim 9, further comprising:
selecting the plurality of projection devices from among connected projection devices; and
inquiring, in the case where geometric correction is applied in a selected projection device, with a user as to whether or not to cancel the geometric correction.

14. The control method of a projection control apparatus according to claim 13, wherein in the selecting, any one of the plurality of projection devices is selected as the reference projection device in response to a user input.

15. The control method of a projection control apparatus according to claim 9, wherein executing the first adjustment process includes controlling the geometric correction of the projected area of each projection device by sending geometric correction parameters of each projection device to each projection device.

16. The control method of a projection control apparatus according to claim 9, wherein the geometric correction is a correction process for correcting at least one of keystone distortion, barrel distortion, and pincushion distortion in the optical images.

17. A non-transitory computer-readable recording medium storing instructions that can be executed by a processor included in a projection control apparatus that controls projection using a plurality of projection devices that project optical images onto a projection plane, the instructions, when executed by the processor, causing the processor to carry out the control method of a projection control apparatus according to claim 9.

18. A projection system comprising:
a plurality of projection devices;
a projection control apparatus that controls projection using the plurality of projection devices, the projection control apparatus comprising at least one processor and/or at least one circuit to perform the operations of the following units: (1) an obtaining unit configured to obtain a projected area of each of the plurality of projection devices on the basis of an image obtained by capturing a projection plane; and (2) a control unit configured to execute a first adjustment process of adjusting the projected area of each projection device so as to cause the projected areas of other projection devices, among the plurality of projection devices, that are not a reference projection device, to correspond to the projected area of the reference projection device, wherein the control unit cancels geometric correction applied in the other projection devices before starting the first adjustment process and does not cancel geometric correction applied in the reference projection device before starting the first adjustment process; and
an image capture apparatus that captures an image of the projection plane.

\* \* \* \* \*